US011986785B2

(12) United States Patent
Bublewitz et al.

(10) Patent No.: US 11,986,785 B2
(45) Date of Patent: May 21, 2024

(54) MIXER HAVING COMPENSATION CHANNEL AND/OR RESERVOIR CHAMBER

(71) Applicant: 3LMED GMBH, Marburg (DE)

(72) Inventors: Alexander Bublewitz, Herborn (DE); Jens-Peter Reber, Meinerzhagen (DE)

(73) Assignee: 3LMED GMBH, Marburg (DE)

( * ) Notice: Subject to any disclaimer, the term of this patent is extended or adjusted under 35 U.S.C. 154(b) by 637 days.

(21) Appl. No.: 16/631,533

(22) PCT Filed: Jul. 26, 2018

(86) PCT No.: PCT/EP2018/070344
§ 371 (c)(1),
(2) Date: Jan. 16, 2020

(87) PCT Pub. No.: WO2019/020768
PCT Pub. Date: Jan. 31, 2019

(65) Prior Publication Data

US 2020/0171448 A1 Jun. 4, 2020

(30) Foreign Application Priority Data

Jul. 28, 2017 (DE) ......................... 102017117198.3
Jul. 28, 2017 (DE) ......................... 102017117199.1

(51) Int. Cl.
*B01F 5/06* (2006.01)
*B01F 3/10* (2006.01)
(Continued)

(52) U.S. Cl.
CPC ........ *B01F 25/43141* (2022.01); *B01F 23/47* (2022.01); *B01F 25/43161* (2022.01);
(Continued)

(58) Field of Classification Search
CPC ......................... B01F 2101/19; B01F 25/4321
See application file for complete search history.

(56) References Cited

U.S. PATENT DOCUMENTS 4,382,684 A 5/1983 Hori
5,487,606 A 1/1996 Keller
(Continued)

FOREIGN PATENT DOCUMENTS

AU 2012222608 A1 9/2013
DE 3606001 U1 8/1987
(Continued)

OTHER PUBLICATIONS

International Search Report and Written Opinion for Int. App. No. PCT/EP2018/070344, dated Oct. 25, 2018.

*Primary Examiner* — Elizabeth Insler
(74) *Attorney, Agent, or Firm* — McDonnell Boehnen Hulbert & Berghoff LLP

(57) ABSTRACT

The present disclosure relates to a mixer having a mixer housing which encloses a mixing chamber, an input part which can be connected to the mixer housing and has at least two input openings for the components to be mixed, and a mixing element, at least some sections of which extend into the mixing chamber, wherein each of the input openings is flow-connected to the mixing chamber via at least one input duct, wherein there is also in the input part at least one compensation duct which connects the input openings to each other, and/or at least one holding chamber is provided in the mixing element.

14 Claims, 22 Drawing Sheets

(51) Int. Cl.

| | |
|---|---|
| ***B01F 15/02*** | (2006.01) |
| ***B01F 23/47*** | (2022.01) |
| ***B01F 25/431*** | (2022.01) |
| ***B01F 25/4314*** | (2022.01) |
| ***B01F 25/432*** | (2022.01) |
| ***B01F 35/71*** | (2022.01) |
| *B01F 101/00* | (2022.01) |
| *B01F 101/19* | (2022.01) |

(52) U.S. Cl.
CPC ...... *B01F 25/4321* (2022.01); *B01F 35/7164* (2022.01); *B01F 25/4314* (2022.01); *B01F 25/43162* (2022.01); *B01F 2101/19* (2022.01); *B01F 2101/2305* (2022.01)

(56) References Cited

U.S. PATENT DOCUMENTS

| | | | |
|---|---|---|---|
| 6,599,008 | B2 | 7/2003 | Heusser |
| 6,837,612 | B2 | 1/2005 | Bublewitz et al. |
| 2001/0015936 | A1 | 8/2001 | Heusser et al. |
| 2004/0008576 | A1 | 1/2004 | Henning |
| 2008/0005606 | A1 | 1/2008 | Koo |
| 2009/0029651 | A1 | 1/2009 | Polini et al. |
| 2010/0020854 | A1 | 1/2010 | He et al. |
| 2012/0019960 | A1 | 1/2012 | Sakurai et al. |
| 2013/0013596 | A1 | 1/2013 | Wang et al. |
| 2014/0301154 | A1 | 10/2014 | Bublewitz et al. |
| 2017/0015758 | A1 | 1/2017 | Hammond et al. |
| 2017/0120206 | A1 * | 5/2017 | Hiemer ............... B01F 25/4342 |

FOREIGN PATENT DOCUMENTS

| | | | |
|---|---|---|---|
| DE | 29902666 | U1 | 6/2000 |
| DE | 10112904 | A1 | 10/2002 |
| DE | 102004008748 | A1 | 9/2004 |
| DE | 102013222111 | A1 | 4/2015 |
| DE | 202012013429 | U1 | 1/2017 |
| EP | 0584428 | A1 | 3/1994 |
| EP | 0664153 | A1 | 7/1995 |
| EP | 0885651 | B1 | 11/2002 |
| EP | 1892033 | A1 | 2/2008 |
| EP | 1458467 | B1 | 5/2008 |
| EP | 1943012 | B1 | 1/2010 |
| EP | 2190563 | B1 | 9/2011 |
| EP | 2527029 | A2 | 11/2012 |
| EP | 2599540 | B1 | 1/2014 |
| EP | 3162433 | A1 | 3/2017 |
| JP | H07000785 | A | 1/1995 |
| JP | H1199325 | A | 4/1999 |
| JP | 2013-111574 | A | 6/2013 |
| JP | 2014-087790 | A | 5/2014 |
| KR | 20130060142 | A | 6/2013 |
| KR | 20140007873 | A | 1/2014 |
| WO | 2012/116863 | A1 | 9/2012 |
| WO | 2012/116873 | A1 | 9/2012 |
| WO | 2013/026722 | A1 | 2/2013 |
| WO | 2017/072079 | A1 | 5/2017 |

* cited by examiner

State of the art

State of the art

Cross-section B-B.

Cross-section E-E.

Cross-section A-A.

Cross-section B-B.

Cross-section C-C.

Cross-section D-D.

Cross-section E-E.

Cross-section F-F.

MIXER HAVING COMPENSATION CHANNEL AND/OR RESERVOIR CHAMBER

CROSS REFERENCE TO RELATED APPLICATIONS

The present application is a U.S. National Phase Application pursuant to 35 U.S.C. § 371 of International Application No. PCT/EP2018/070344 filed Jul. 26, 2018, which claims priority to German Patent Application No. 102017117198.3 filed Jul. 28, 2017 and German Patent Application No. 102017117199.1 filed Jul. 28, 2017. The entire disclosure contents of these applications are herewith incorporated by reference into the present application.

TECHNICAL FIELD

The present disclosure relates to a mixer with a mixer housing, which encloses a mixing chamber, an inlet connectable with the mixer housing, which has at least two input openings for the components to be mixed, and a mixing element at least some sections of which extend into the mixing chamber, wherein each of the input openings is flow-connected with the mixing chamber by way of at least one input channel.

BACKGROUND

Generic static and dynamic mixers are used, for example, in the area of dentistry or for building materials and adhesives. The mixing element of the mixer serves for the homogenous mixing of several, usually two, viscous or pasty components, which are stored separately in a cartridge or a similar container in a dischargeable manner. Typical consistencies/viscosities for dental impression materials are described in the standard norm DIN EN ISO 4823. Through the mixing process, a reaction of the individual components to each other is frequently started, whereby the actual material to be processed, such as a dental material or a building material or adhesive, is formed. Depending on the composition of the components to one another and the areas of application, these are mixed in different ratios. Typical mixture ratios include 1:10, 1:5, 1:4, 1:2 and 1:1.

Since the compositions and concentrations of the viscous/pasty components (in the following also simply termed: components) and their mixture ratios are coordinated with one another, it is decisive that the ratio of the components to one another is not only preserved in the filling process in the cartridge, but also in the mixing process itself.

The filling of the components into the cartridges is technically connected with certain variations in filling level, typically in the range of 5% and, with higher technical expenditure, even 1% of the volume filled. In addition, the arrangement of the respective dispensing pistons is connected with certain tolerances. It thus happens that one of the pistons is positioned further forward in the direction of discharge. Both the technical variations in the filling level as well as the slightly different arrangement of the dispensing pistons leads to the fact that one of the components enters into the mixing chamber before the other component. Furthermore, the breakaway torque of the dispensing piston, i.e., the initial impulse of the dispensing piston, may also turn out differently upon the moving out of the bearing position in the direction of discharge, particularly for reason of fluctuations in manufacturing, so that, even upon a perfect filling, one of the components enters into the mixing chamber before the other component. Since the components to be mixed generally have a different composition, the components furthermore differ in their rheology and thus in their discharge behavior. Since a different composition inherently forms the basis for a multi-component system, it is not possible to rule out, even with the optimization of the known constructions and the filling process, that one of the components will enter into the mixing chamber before the other components, even with 1:1 cartridges.

In other words, it must necessarily be observed that the one component forms a so-called forerun that enters into the mixing chamber before the other component, so that at least the initial ratio of the components to one another differs from the ideal mixture ratio. Such a forerun frequently leads to the fact that this is discharged out of the mixer in unmixed form. The component forming the forerun in unmixed form must be discarded, because it does not have the properties of the material to be processed.

Although the filling-conditioned fluctuations and irregularities of the positioning of the piston appear upon all viscous or pasty components, these are often tolerated, particularly upon large-volume and economical components, such as sealing materials or adhesives, for example. For small-volume and high-priced components, such as dental materials for example, these fluctuations are not acceptable, however, because a greater portion of the expensive material must be discarded.

In addition, the discarding of the forerun is cumbersome for the user and is connected with a safety risk upon the application, since the forerun does not have the adhesion, impact strength and/or strength properties that are maintained for the mixture. An unintended use of the forerun can lead to undesirable results, even from optical viewpoints.

EP 2 599 540 B1 describes a mixing element for a static mixer that reduces the forerunning of a component, since this component is brought forward to the mixing element via an input channel separate from the other component. A forerun known in advance can be compensated through the separate guiding of the components.

EP 2 527 029 A2 discloses a mixer with a star-shaped baffle plate which has a central pin or mandrel extending upstream into the materials stream which, upon diverging in its direction of flow, passes into an axially perpendicular plate.

WO 2012 116 873 A1 likewise relates to the compensation of a forerun. For that purpose, two delay chambers and a deflection element are provided, whereby the deflection element redirects the flows of components radially inwardly.

Furthermore, documents EP 0 664 153 A1, EP 0 584 428 A1, DE 29 902 666 U1, and DE 3 606 001 A1 describe generic static mixers which relate to the above-described problems.

US 2012/0 199 607 A1 discloses a discharge device with a two-component cartridge and a mixer that can be placed on this. The mixer is intended to be easily attached to and removed from the cartridge.

DE 36 06 001 A1 describes a dosing and mixing gun for multi-component plastics. Each component is guided into the static mixing chamber through a supply channel provided with a throttling device.

In the documents WO 2013 0 26 722 A1, EP 1 943 012 B1, DE 10 112 904 A1, DE 10 2004 008 748 A1, DE 299 02 666 U1, EP 2 190 563 B1, EP 1 458 467 B1 and EP 1 892 033 A1 dynamic mixers are described which are intended to compensate for a forerun.

A mixer with a unification chamber accommodating a forerun, which is provided inside a mixer intake area, is known from EP 0 885 651 B1. The component intake openings are thereby divided by means of a separation rib and extend the path of travel of the component present in excess.

For the above-described solutions, the fact that a filling-conditioned variation of a component present in excess acts more strongly than upon a component present in insufficient quantity is essentially employed. A forerunning of the component present in excess therefore comes about only when a filling-conditioned variation present in the component in insufficient quantity forms no forerun. Particularly upon . . . high surpluses, a component, such as with common 1:10 mixing ratios, for example. A forerun of component present in excess therefore also comes about, because the container accommodating this component and the associated dispensing pistons are significantly larger than the respective components of the component present in insufficient quantity. In other words, it must absolutely be determined in the known solutions before the filling of the components which component is present in excess and whether a forerun has thus been formed. Therefore, the known solutions are usable only upon unequal mixing ratios.

Upon mixing ratios of 1:1 and, in part, already upon similar mixing ratios with slight differences in volume, such as 1:1, 2.5 or 1:2, for example, it is not possible to securely predict which of the components is present in too high portions, however, and that a forerun has therefore been formed. This problem appears in all known multi-component cartridges and, in particular, independently of whether a static or a dynamic mixer is used.

SUMMARY

The object of the present disclosure is therefore to provide a mixer which, for all mixing ratios, particularly with slight differences in volume, such as 1:1 to 1:2, accommodates the forerun, which can in particular be formed both from the first component as well as from the second component.

This object is solved with a mixer in accordance with claim 1.

It is provided in accordance with the disclosure that the mixer has a mixer housing with a mixing chamber, an inlet connectable with the mixer housing, which has at least two input openings for the components to be mixed, and a mixing element, wherein the mixing element extends in at least some of its sections into the mixing chamber. Here, each of the input openings is flow-connected with the mixing chamber by way of at least one input channel. It is additionally provided that at least one compensation channel is formed in the inlet, which connects the input openings to each other. In addition or as an alternative to this, at least one reservoir chamber for the accommodation of the forerun is provided in the mixing element.

Through the connection of the input openings with a compensation channel, the forerun exiting at the input openings can enter into the compensation channel and be collected there as forerun. Since the input openings are connected to each other, the forerun is collected independently of the component that forms the forerun. In other words, the connection between the input openings ensures that the components enter into the compensation channel through these input openings without a preselection in regard to the component forming the forerun having to be made.

The compensation channel permits self-regulation in regard to the forerun since the compensation channel is first of all filled by the forerunning component until the additional component flows into the compensation channel and prevents an additional filling of the compensation channel by the forerunning component. Both may subsequently enter into the mixing chamber separately or together through the input channels.

In other words, the disclosure may be seen in the fact that a, particularly radial open, compensation channel is provided. The compensation channel can thereby be formed by an external closed ring and by an internal ring with symmetrically positioned openings.

During the discharge, the forerunning component expands far enough in the compensation channel until it meets the trailing component. A variable front of components thereby arises, depending on the forerun path. The components form a contact surface with this front. After the compensation channel is filled, the front of the components remains in its position in the compensation channel, which leads to the fact that the additional inflowing mass of components flows into the inlet to the mixing chamber and then axially in the direction of discharge in the shortest path from the input openings through the corresponding openings.

The arrangement of at least one reservoir chamber in the mixing element likewise permits the accommodation of the forerun independently of which of the components forms the forerun, since the reservoir chamber, or the reservoir space in which the mixing element is provided, is thus filled by the forerunning component. The reservoir chamber in accordance with the disclosure is thereby configured in such a way that the forerun is accommodated and remains in the reservoir chamber. The reservoir chamber is thereby preferably positioned in the first third of the mixing chamber in the direction of flow of the components.

The reservoir chamber is preferably configured in such a way that it has closed lateral walls and has only one opening, which is formed as an input opening in a transverse wall. Since the reservoir chamber has only one input opening, but is not otherwise flow-connected with the other chambers, the forerun entering into the reservoir chamber is held there, however, so that this essentially no longer participates in the additional mixing process.

The mixer in accordance with the disclosure may be a static or a dynamic mixer.

It is particularly advantageous in accordance with the disclosure that the compensation channel is provided in the inlet. Thus, the compensation channel can be made for any type of mixer and functions independently of the specific configuration of the mixer.

In one preferred variant, the internal volume of the compensation channel and/or the reservoir chamber is adjusted to the filling-conditioned variations in such a way that the variations in the volume of the components are smaller than the internal volume of the compensation channel and/or of the reservoir chamber. In other words, the internal volume of the compensation channel and/or of the reservoir chamber corresponds to 1% to 10%, particularly 1% to 8%, and particularly preferably to 1% to 5%, of the volume of a component if a mixture ratio of 1:1 is present. Upon a mixture ratio differing from 1:1, the volume of the component present in larger portions is decisive.

Alternately or as a supplement to that, the internal volume of the compensation channel and/or of the reservoir chamber corresponds to 1% to 10%, particularly to 1% to 8%, and particularly preferably to 1% to 5%, of the volume of the component present in excess in relation to the volume of the component present in insufficient quantity or of the volume of the component present in insufficient quantity in relation to the volume of the component present in excess.

In one preferred configuration, two compensation channels are formed in the inlet, which each connect the input openings to each other. This prevents any possible blocking of the flow connection from the input opening to the mixing chamber.

In one additional configuration, the input channels are designed in such a way that the components to be mixed are separately guided away from one another and into the mixing chamber. Through that fact, a premature reacting of the components and a possible blocking of the input channels is prevented. In addition, the separate feeding of the components into the mixing chamber allows a better mixing of the components with one another.

It is additionally preferred if the two input openings are positioned diametrically opposed to one another in the inlet, whereby the input channels extend along a diagonal connecting the input openings and are separated from one another by a partition wall extending transversely to the diagonal. The partition wall prevents a mixing of the components possibly occurring in the input openings, through which these could be blocked. The partition walls are preferably formed along a portion of the circumference of an input opening.

If the entire circumference of the input opening for the flowing of the components into the at least one compensation channel is available, then it is particularly preferable if the partition walls are positioned along less than 50%, preferably less than 40% and, most particularly preferably, to between 20% and 30% of the entire circumference of the corresponding input opening.

If the entire circumference of the input opening is not available for the inflowing of the components, such as because the flowing of the components through the input openings on the radial edge of the inlet is partially blocked, for example, then it is particularly preferable if the partition walls are positioned along less than 80%, preferably less than 70%, and are most particularly preferably positioned at between 40% and 60% of the circumference available for the inflowing of the corresponding input opening.

In accordance with one additional preferred configuration, the input channels are designed in such a way that the components to be mixed with one another are guided into the mixing chamber, at least in certain areas, in an enveloping manner. This supports the subsequent mixing process in the mixing chamber.

As an alternative to that, the input channels may be flow-connected with one other, so that the components to be mixed are jointly guided into the mixing chamber.

In one preferred variant, the at least one compensation channel extends in an essentially circular arc between the input openings. Such an arrangement ensures that the components can flow into the compensation channel from each of the input openings.

In one additional embodiment, the at least one compensation channel extends radially outside the input channels. Through that fact, the forerun is guided externally from the input openings or input channels, as the case may be, and into the compensation channel, which is particularly preferred if the inlet is positioned centrally in the mixing chamber, considered radially. This leads to the fact that the forerun first of all fills the external compensation channel and the components can subsequently enter into the mixing chamber together. An interruption of the input channels by the compensation channel is thus prevented and, furthermore, a relatively short path from the input openings into the mixing chamber is ensured, since this path leads along the input channels centrally into the mixing chamber. This additionally reduces the discharge pressure, since the components must be discharged over a short path of travel with less expenditure of energy.

Furthermore, it is preferable if the at least one compensation channel and the input channels are formed as depressions or grooves in the inlet and are sealed off, at least in certain areas, from the mixer housing or the mixing element. Since the inlet is produced separately from the mixer housing, additional material can be saved in this variant during the manufacture. It is thereby particularly preferred if the mixer housing or the mixing element of the compensation channel is covered by a disk-shaped or funnel-shaped collar in the intake area of the mixing chamber.

It is furthermore preferred if the compensation channel has a mirror plane extending through the middle points of the input openings. In addition or as an alternative to this, the compensation channel may have a multiple rotation-reflection axis. The numerical value of the rotation-reflection axis corresponds, in one preferred variant, to the number of the input openings. If, therefore, two input openings are present, then a two-fold rotation-reflection axis is preferred, if three input openings are present, then a three-fold rotation-reflection axis is preferred, and so forth. This symmetry ensures that a compensation of the forerun is ensured upon mixing ratios of 1:2 to 1:1 or 1:1:2 to 1:1:1 for more than two components independently of the respective forerunning component.

Finally, it is preferable that the inlet and the mixer housing are designed and adjusted to one another in such a way that the components exiting from the input openings and to be mixed are deflected from a direction of flow extending in parallel with the longitudinal axis of the mixer housing by 90° in a direction of flow transversely to the longitudinal axis of the mixer housing. The deflection prevents the components on the compensation channel from moving directly forward and into the mixing chamber.

In one preferred embodiment, a flow wall is provided along the circumference of at least one input opening, which [flow wall], considered from the corresponding input opening, is formed in a concave or convex manner.

Particularly for the case that the entire circumference of the input opening is available for the flowing of the components into the at least one compensation channel, it is preferable if the flow wall is positioned, particularly along less than 50%, preferably less than 40% and, most particularly preferably, to between 20% and 30%, of the entire circumference of the corresponding input opening.

If the entire circumference of the input opening is not available for the inflowing of the components, such as because the flowing of the components through the input openings on the radial edge of the inlet is partially blocked, for example, then it is preferable if the flow wall is positioned, in particular, along less than 80%, preferably less than 70% and, most particularly preferably, to between 40% and 60% of the circumference available for the inflowing of the corresponding input opening.

In continuation of this line of thought, it is preferable that the at least one flow wall is closed in a sealing manner with a disk-shaped or funnel-shaped collar of the mixer housing or of the mixing element. In other words, the axial length of the flow wall corresponds to the axial length of the compensation channel.

If several flow walls are provided, then it is preferable to arrange these at a distance from one another, so that the components can flow in through the recesses thereby formed between the flow walls centrally in the direction of the mixing element. The extent of the distance of two adjacent flow walls to one another thereby defines the drop in pressure in the center to the mixing element. The distance is preferably selected in such a way that the drop in pressure between the walls is greater than the drop in pressure in the compensation channel, so that forerunning material flows into the compensation channel before it enters centrally into the mixing chamber.

This is preferred if the inlet has a reservoir space that extends radially outwards of the compensation channel and/or the input channels. The reservoir space is closed off from the components in the direction of discharge of the material, so that the components from the reservoir space cannot flow into the mixing element. This delimits the reservoir space from the input channels. A reservoir space is particularly advantageous if a large-volume forerun is to be expected. A reservoir space with mixing ratios diverging from 1:1, particularly 1:10, is therefore particularly advantageous.

Furthermore, it is preferable, if at least one optional baffle plate and/or a flow clamp, which at least partially covers and/or laterally restricts the corresponding input opening, is assigned to one of the input openings. The baffle plate is preferably provided above the corresponding input opening and therefore lies directly in the direction of discharge of the material, so that the component that flows through the corresponding input opening, exits from the input opening at the exit and strikes the baffle plate and is deflected, particularly in the direction of the mixing chamber. The flow clamp preferably laterally restricts the corresponding input opening in such a way that the component that flows through the corresponding input opening is guided at the exit from the input opening in the direction of the mixing chamber. Both the baffle plate as well as the flow clamp thus make it possible to set a direction of flow for the component flowing out from the corresponding input opening. This is particularly advantageous if the portion of the corresponding component is small, so that this component can flow into the mixing chamber nearly completely and possible remnants in the inlet can be minimized. The above-described advantages of the baffle plate can thereby also be achieved on a collar provided on the mixing element if this, comparable to the baffle plate, covers at least one of the input openings, if the inlet and the mixing element are mounted in the mixer.

It is furthermore preferable if the mixing element has a flow chamber adjacent to the reservoir chamber, which stands in a flow-connected manner with the mixing chamber by way of a through-opening.

In continuation of this line of thought, it can be provided that that the flow chamber is restricted in the direction of discharge of the material by a transverse wall and that the transverse wall comprises a transverse wall opening, so that the components can at least partially flow in through the transverse wall opening. This reduces the discharge pressure upon the discharge of the components through the mixer, which leads to a greater user-friendliness when discharged.

It is additionally preferable if the cross-section of the mixing element positioned perpendicularly to the direction of discharge of the material amounts, in the section of the reservoir chamber and/or flow chamber, to 105% to 150%, preferably 105% to 120%, particularly preferably to 110%±5%, of the cross-section of the mixing element positioned perpendicularly to the direction of discharge of the material into the following section of the mixing element considered in the direction of discharge of the material. In other words, the mixing element is enlarged in an area of the reservoir chamber and/or flow chamber. This leads to the fact that a higher cross-section of flow can be achieved in this area with constant stability of the mixing element, which is advantageous for the reduction of the discharge pressures, particularly upon highly viscous components. Furthermore, the holding capacity of the reservoir chamber is improved, so that a large-volume forerun can be accommodated.

The reservoir chamber and/or flow chamber are preferably provided in the section that is covered with the inlet section of the mixing case, which has the advantage that an expansion of the mixing element can be accommodated in this section by means of a corresponding adjustment of the internal contour of the inlet section of the mixing case. Otherwise, the mixing case can, of course, even be adjusted corresponding to the expanded contour of the mixing element.

BRIEF DESCRIPTION OF THE FIGURES

The disclosure will be explained in further detail in the following by means of exemplary embodiments and with reference to the diagrams. All the characteristics described and/or graphically represented thereby form the object of the disclosure, either by themselves or in any desired combination, independently of their summary in the claims or in their referrals back to the same.

The following are depicted schematically.

DETAILED DESCRIPTION

Figure 1A:
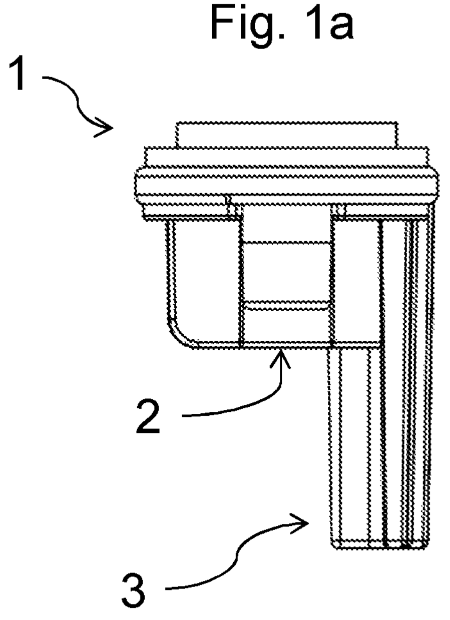
FIGS. 1*a*, 1*b*, 1*c* and 1*d* show a first side views (FIG. 1*a*), a second side view (FIG. 1*b*), a view from above (FIG. 1*c*), and a perspective view (FIG. 1*d*) of a first inlet.
Figure 1B:
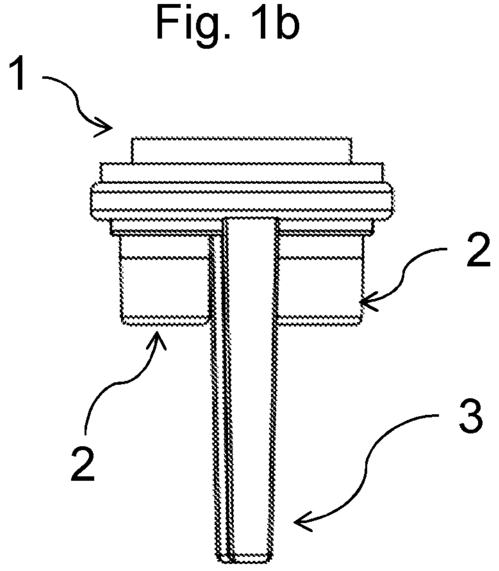
Figure 1C:
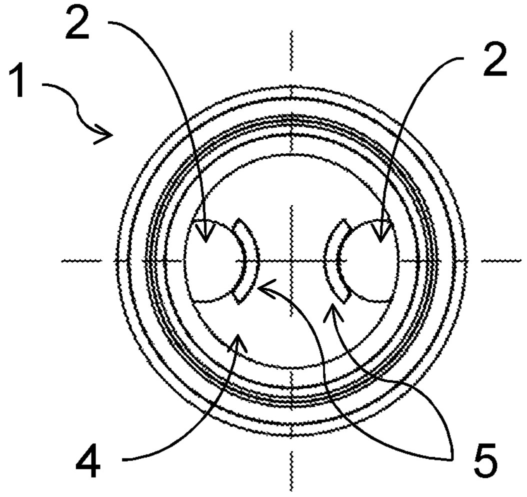
Figure 1D:
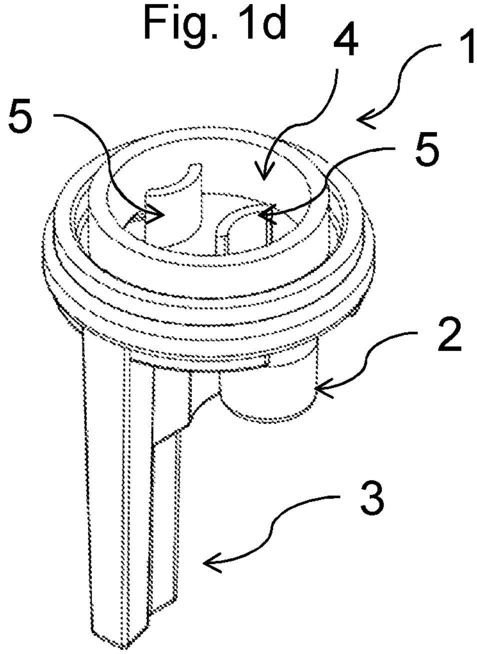

FIGS. 1*a* to 1*d* depict a first embodiment of the inlet 1 with input openings 2 for the components to be mixed. The first inlet 1 has a guide projection 3. Its function is explained in WO 2013/026716 and reference is accordingly made to the same.

At least one compensation channel 4 is formed between the input openings 2 (FIGS. 1*c* and 1*d*), which channel connects the input openings 2 with one another. Forerun entering through the input openings 2 is accommodated by the compensation channel 4. The input openings 2 are positioned diametrically opposite one another. Furthermore, a flow wall 5 is provided on each of the input openings 2, which flow wall is formed along a portion of the circumference of each input opening 2. Considered from the respective input opening 2, on which the corresponding flow wall 5 is formed, the flow wall 5 is positioned along the circumference and is thereby shaped in a concave manner. In the case depicted here, the components cannot flow through the entire circumference of the input openings 2 into the compensation channel 4, as can clearly be seen in FIG. 1*c*.

Figure 2A:
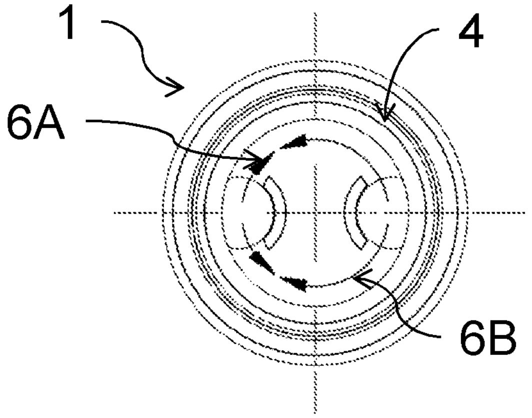
FIGS. 2*a*, 2*b*, and 2*c* show several views from above of the first inlet with an illustration of the directions of flow of the components.
Figure 2B:
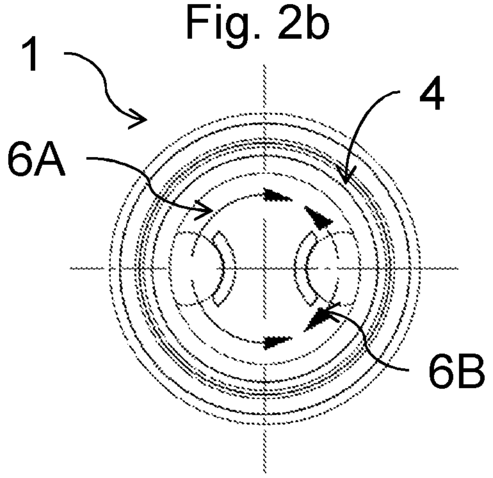
Figure 2C:
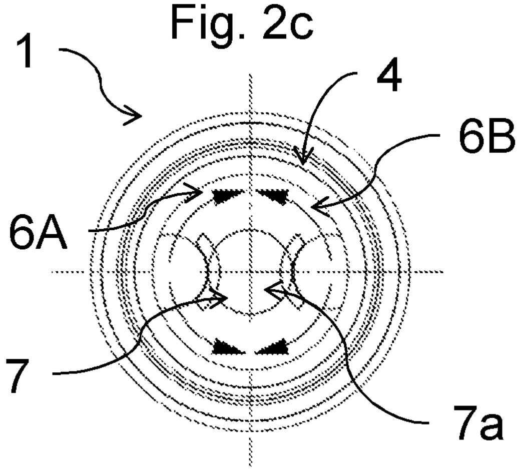

The operating principle of the compensation channel 4 is explained by means of FIGS. 2*a* to 2*c*.

In FIG. 2*a*, the component B forms a forerun. This exits through an opening and flows along the direction of flow 6B past a flow wall 5 and into the compensation channel 4. The forerun of component B likewise flows along the compensation channel 4 until the component A moves along the direction of flow 6A and enters into the compensation channel 4 and stops the forerun of component B. Both components A and B subsequently flow centrally through an additional intake opening into the mixing chamber (not depicted).

In the example depicted in FIG. 2*b*, the component A forms the forerun, which flows along the direction of flow 6A into the compensation channel 4, until the component B likewise flows into the compensation channel 4.

In the example depicted in FIG. 2*c*, no component forms a forerun, so that both components meet in the compensation channel 4 after half a flow path and subsequently enter into the mixing chamber (not depicted) through an opening 7 depicted here centrally. The input channel 7*a* connects the input openings 2 with the mixing chamber (not depicted) by way of the opening 7.

Figure 3A:
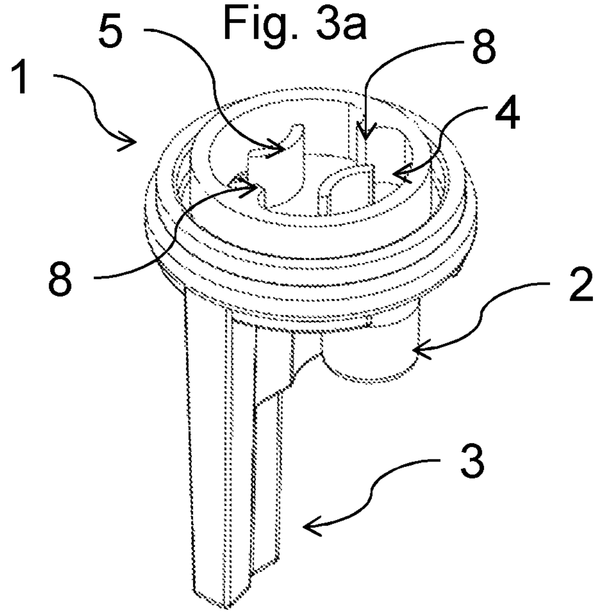
FIGS. 3*a* and 3*b* show a perspective views (FIG. 3*a*), and a view from above (FIG. 3*b*) of a second inlet.
Figure 3B:
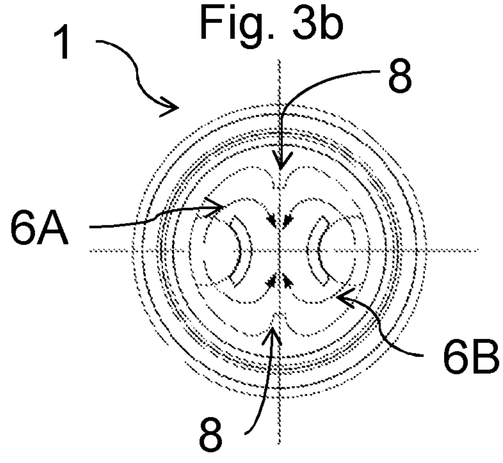

FIGS. 3*a* and 3*b* depict, in a perspective view (FIG. 3*a*) and in a view from above (FIG. 3*b*) a modification of the first inlet as a second embodiment, wherein at least one indentation 8 projecting into the compensation channel 4 is provided between the input openings 2. In the case depicted here, two indentations 8 positioned opposite one another are provided, which indentations guide the directions of flow 6A and 6B of the components A and B more strongly to the central opening 7 of the mixing chamber (not depicted).

A third embodiment of the inlet 1 is depicted in FIGS. 4*a* to 4*e*. In comparison with the first inlet 1, two additional flow walls, termed deflecting walls 9 here, are provided which, together with the flow walls 5, which are positioned in the input openings 2, form a circular structure 10. The flow walls 5 are so configured in a convex manner by the respective input opening 2 that the middle point of the circular structure 10 coincides with the middle point of the inlet 1.

Figure 4A:
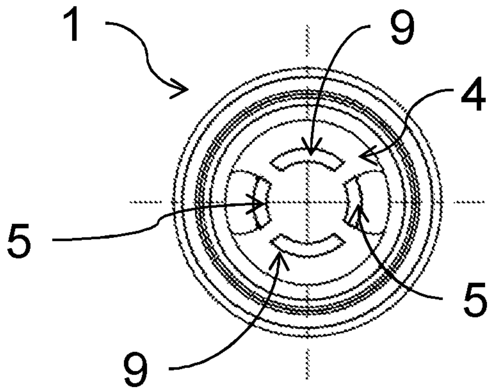
FIGS. 4*a*, 4*b*, 4*c*, 4*d* and 4*e* are views from above (FIG. 4*a*), a perspective view (FIG. 4*b*), and an additional view from above (FIGS. 4*c*, 4*d* and 4*e*) of a third inlet.
Figure 4B:
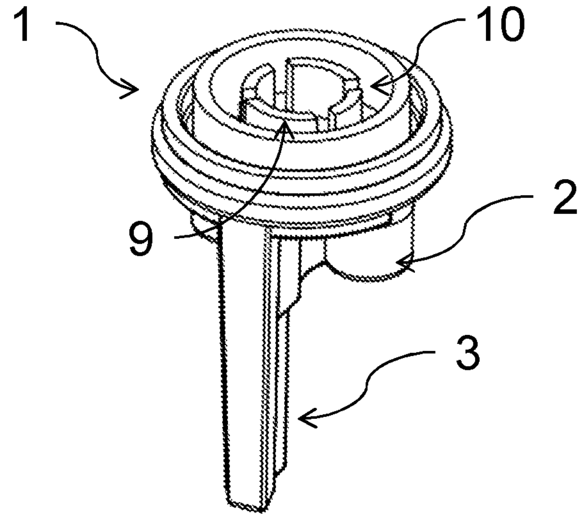
Figure 4C:
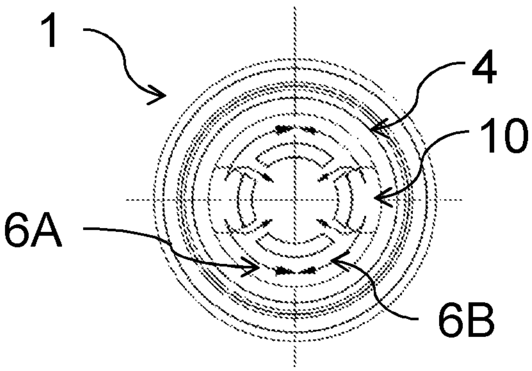
Figure 4D:
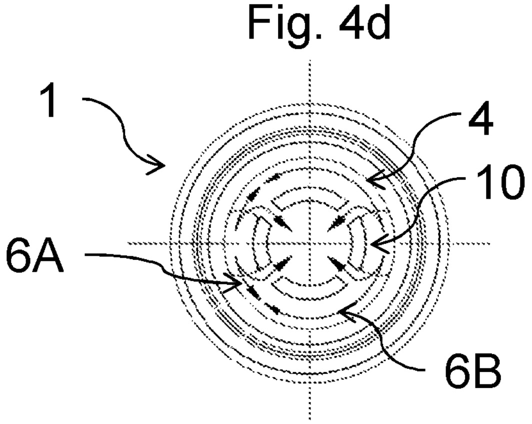
Figure 4E:
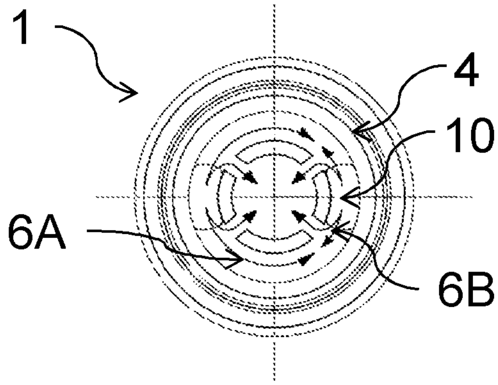

FIG. 4*c* depicts the direction of flow 6A and 6B for the case that none of the components forms a forerun, while, in the case depicted in FIG. 4*d*, the component B forms a forerun and, in FIG. 4*e*, the component A forms a forerun.

The flow walls 5 and the deflecting walls 9 are positioned at a distance from one another, so that openings form between each deflecting wall 9 and the adjacent flow walls 5, or each flow wall 5 and the adjacent deflecting walls 9, as the case may be. The components A and B can flow through the openings into the centrally positioned inlet of the mixing chamber (not depicted). On the basis of the arrangement of the flow walls 5 and the deflecting walls 9, the components A and B first of all fill the compensation channel 4 and subsequently flow centrally into the mixing chamber through at least one input channel 7*a*.

Figure 5A:
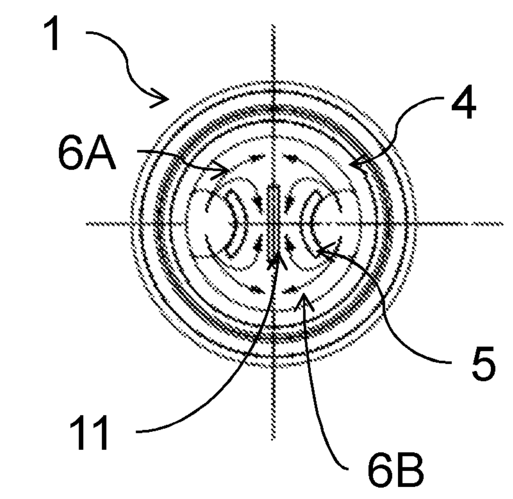
FIGS. 5*a* and 5*b* are views from above (FIG. 5*a*), and a perspective view (FIG. 5*b*) of a fourth inlet.
Figure 5B:
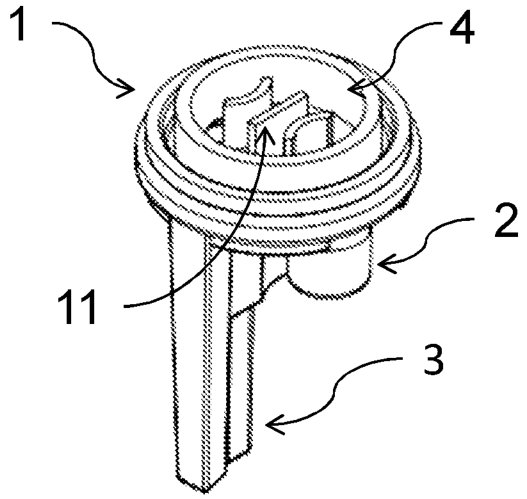

In FIGS. 5*a* and 5*b*, a fourth embodiment of the inlet 1 is depicted, which is based on the first embodiment of the inlet 1, but has been supplemented by a partition wall 11, however. The partition wall 11 lies between the input openings 2 and below the central entrance area to the mixing chamber (not depicted). Furthermore, two input channels of the components are separated from one another by the partition wall 11 in the mixing chamber.

Figure 6A:
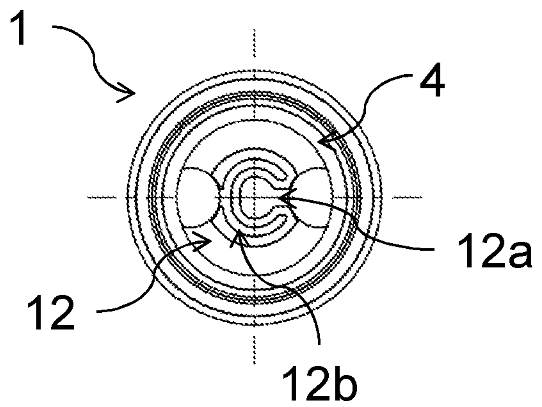
FIGS. 6*a*, 6*b* and 6*c* are views from above (FIG. 6*a*), a perspective view (FIG. 6*b*), and a view from above (FIG. 6*c*) of a fifth inlet.
Figure 6B:
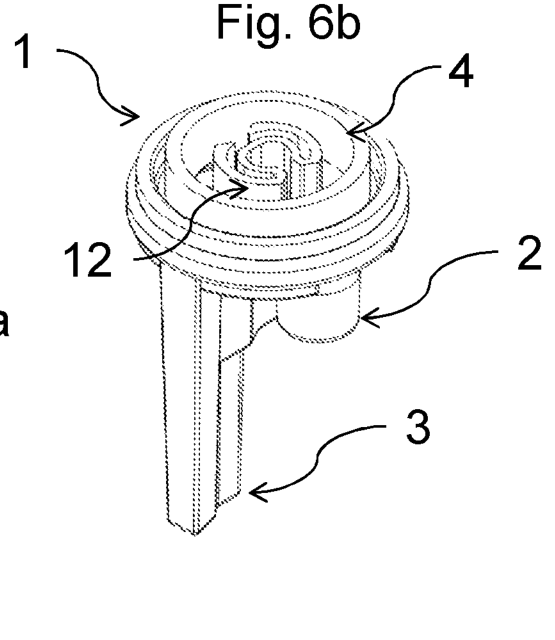
Figure 6C:
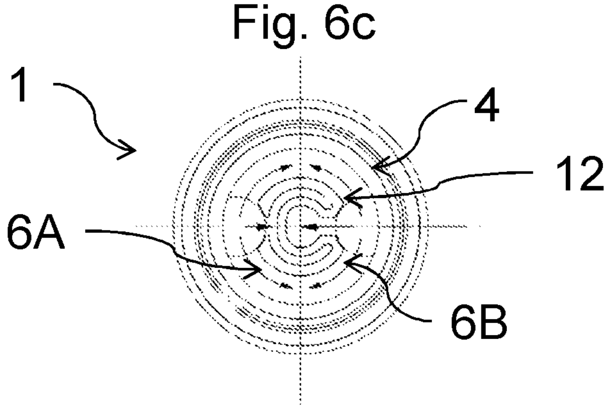
Figure 7A:
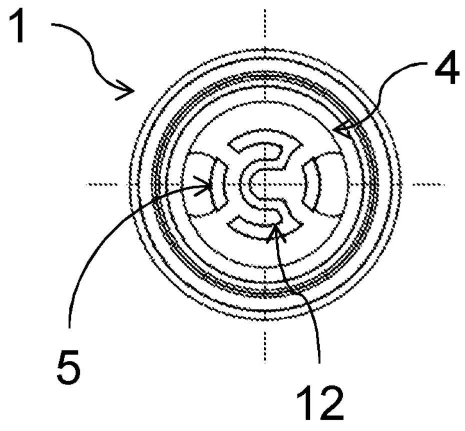
FIGS. 7*a*, 7*b*, 7*c*, 7*d* and 7*e* are views from above (FIG. 7*a*), a perspective view (FIG. 7*b*), and an additional view from above (FIGS. 7*c*, 7*d* and 7*e*) of a sixth inlet.
Figure 7B:
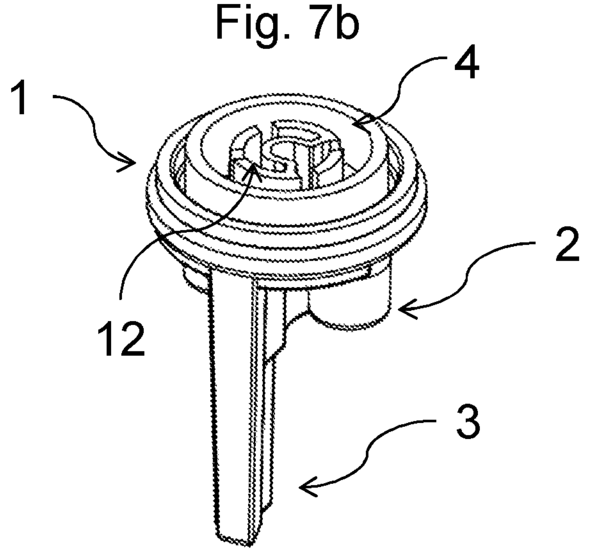
Figure 7C:
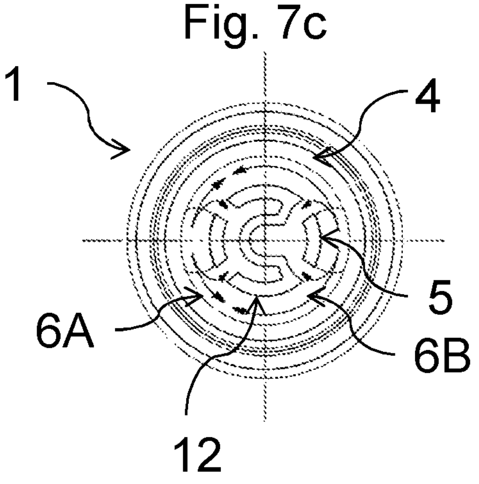
Figure 7D:
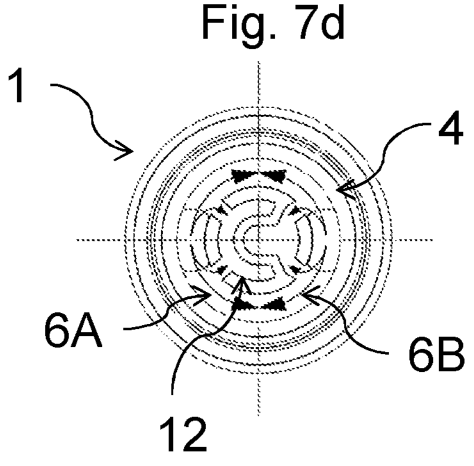
Figure 7E:
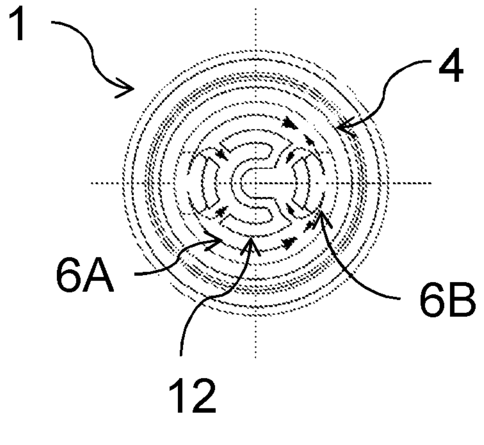

The fifth embodiment of an inlet 1 depicted in FIGS. 6*a* to 6*c* has an enveloping element 12 centrally positioned in the inlet 1. A circumferential compensation channel 4 that accommodates the forerun of components A and/or B is provided radially around the enveloping element 12.

The enveloping element 12 is configured in an essentially circular manner and has a central opening 12*a*, which opens in the direction of an input opening of a component and leads this centrally in the direction of the mixing chamber. An additional opening is positioned opposite the central opening 12*a* in the direction of the other component, which directs this into an essentially semi-circular channel 12*b* around the central opening 12*a*. This leads to the fact that the components A and B are introduced into the mixing chamber approximately coaxially into one another, which facilitates the subsequent mixing of both components in the mixing chamber.

The directions of flow 6A and 6B of the components A and B are depicted in FIG. 6*c*. In the case depicted here, no forerun of components A and B is formed.

FIGS. 7*a* to 7*e* depict a sixth embodiment of the inlet 1 with an additional variant of a enveloping element 12 with flow walls 5. The flow walls 5 prevent a direct flowing of the components A and B into the enveloping element 12. Through that fact, the resistance of flow to the flowing in of the enveloping element 12 is increased, so that this embodiment is preferred for thinly viscous components.

Figure 8A:
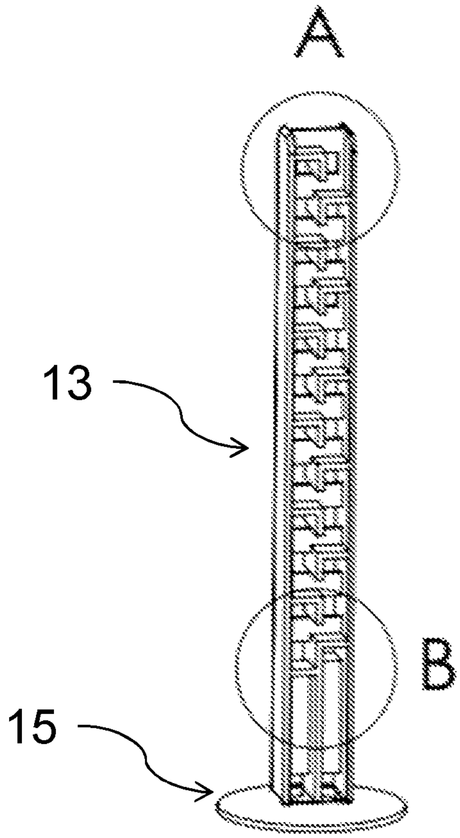
FIGS. 8*a*, 8*b* and 8*c* show a perspective views (FIG. 8*a*), a side view (FIG. 8*b*) and a detailed view B (FIG. 8*c*) of a first mixing elements.
Figure 8B:
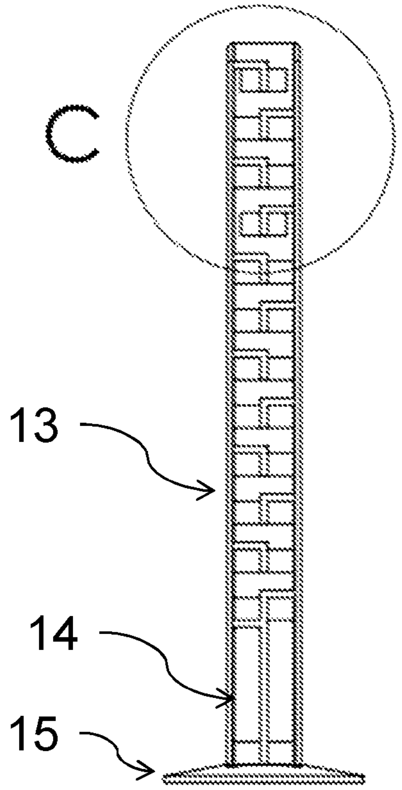
Figure 8C:
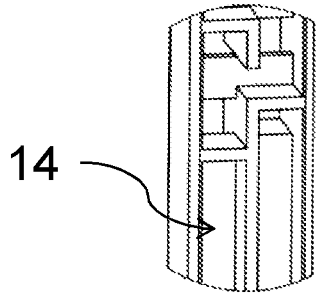

FIGS. 8*a* to 8*c* depict a mixing element 13 with reservoir chambers 14, which are positioned in the entrance area of the mixing chamber and can accommodate the forerun that occurs. The reservoir chambers 14 are sealed on their ends in the direction of flow of the components, so that the forerun does not enter into the additional mixing chamber and does not distort the mixing ratio.

The mixing element 13 has a disk-shaped or funnel-shaped collar 15 on the inlet side. It is configured in such a way that it covers the inlet 1 and seals the compensation channel 4 in certain areas or as a whole.

Figure 9A:
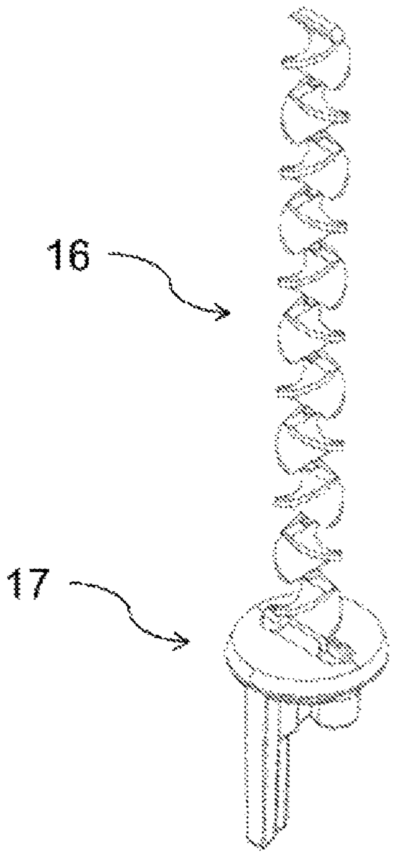
FIGS. 9*a* and 9*b* are perspective views (FIG. 9*a*) of a helical mixer and a view from above of the corresponding mixer connection (FIG. 9*b*) in accordance with the state of the art.
Figure 9B:
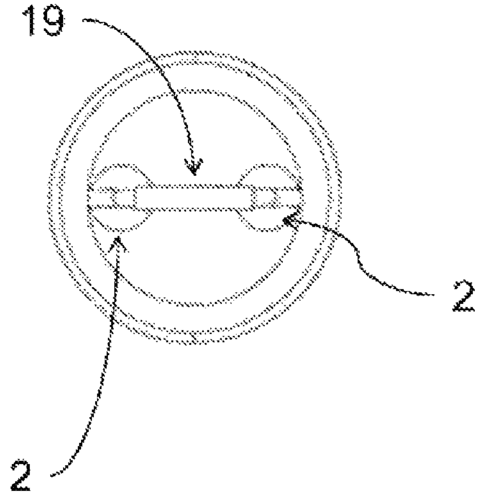
Figure 10:
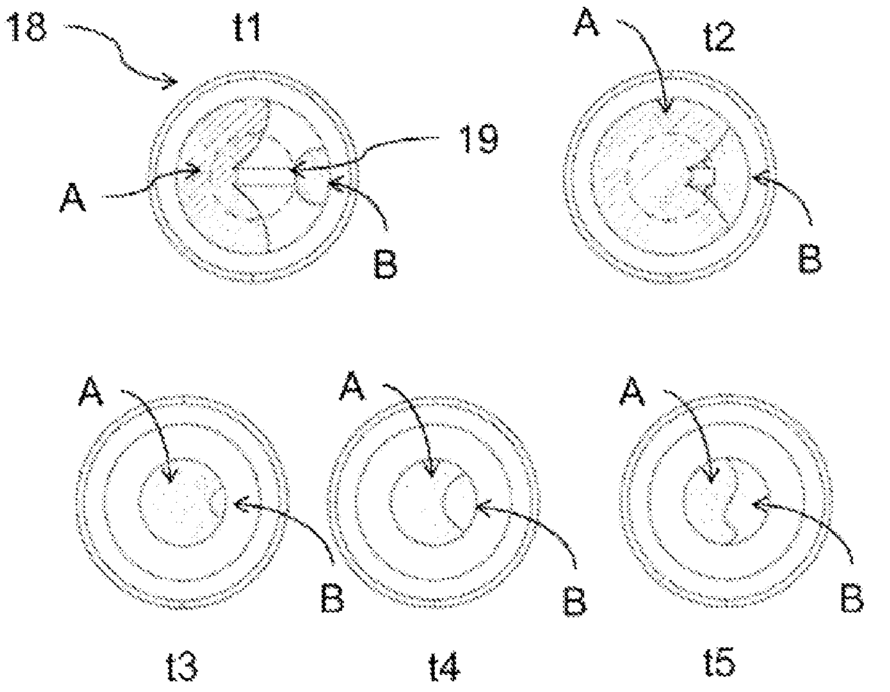
FIG. 10 shows views from above of an inlet and of a mixer upon the discharge of two components at different points in time in accordance with the state of the art.

For a better understanding of the effects in accordance with the disclosure, a helical mixer 16 with a connection 17 and with an inlet 18 known in accordance with the state of the art is depicted in FIGS. 9*a*, 9*b* and 10. FIG. 9*b* depicts the first web 19 of the helical mixer, as well as the input openings 2 through which the components flow into the inlet 18.

For the illustration of the problem forming the basis for the disclosure in accordance with the state of the art, FIG. 10 depicts, at points in time t1, t2, t3, t4 and t5, which are different and increase in this sequence, the components A and B and their boundary surface in the inlet 18. At the point in time t1, it is clear that the one component clearly collects more volume in the inlet 18 than the second component. The first component thereby forms a forerun and is, at point in time t2, present nearly exclusively in the inlet 18. Thus, in the view from above depicted at the bottom in FIG. 10 of the mixer and through the mixer tube, the forerunning component is present practically exclusively in the mixing element, even at the point in time t3. Only upon the additional discharges (points in time t4 and t5) does the portion of component A drop.

Figure 11:
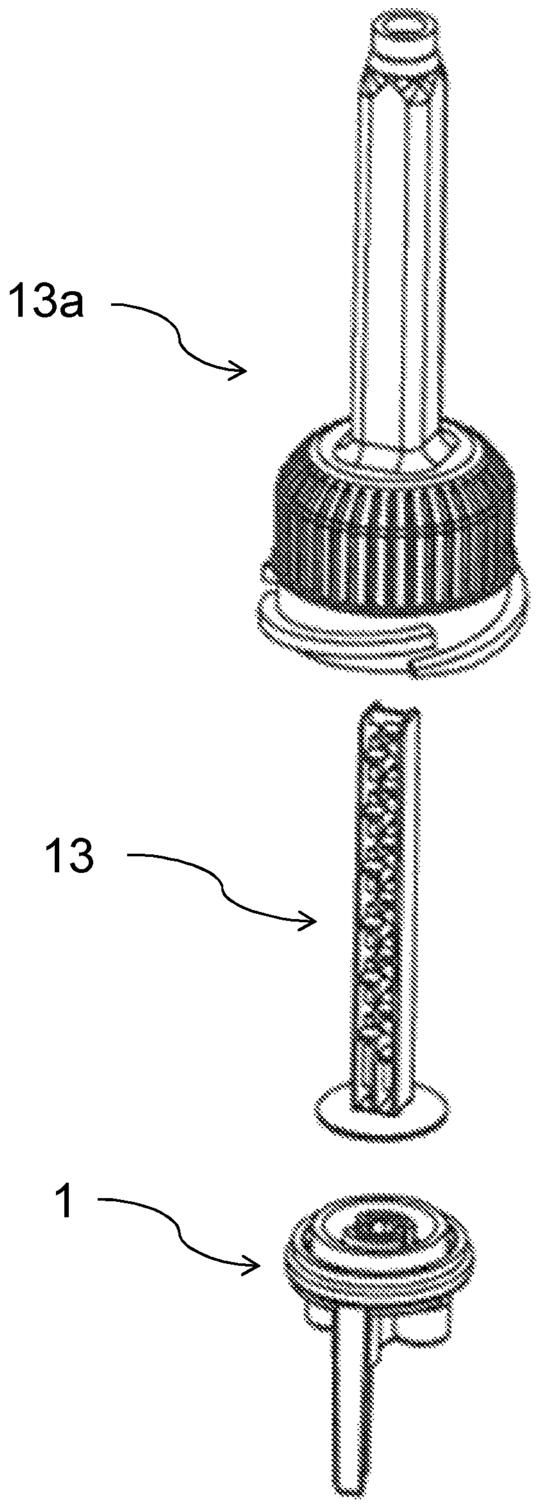
FIG. 11 is an exploded view of a mixer in accordance with the disclosure, with a mixing element, a mixer housing, and an inlet.

FIG. 11, in an exploded view, depicts a mixer in accordance with the disclosure with a mixing element in accordance with FIGS. 8*a* to 8*c*, a mixer housing 13*a*, and an inlet 1.

Figure 12A:
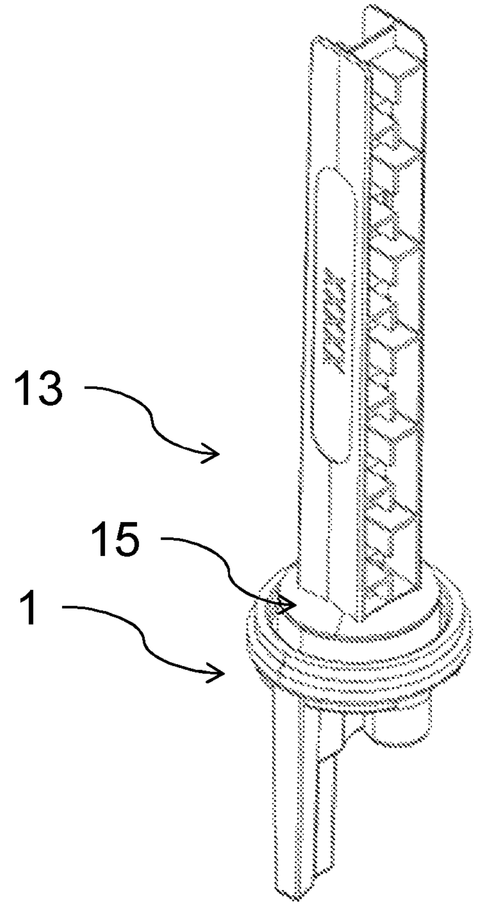
FIGS. 12*a* and 12*b* show a first perspective view (FIG. 12*a*) and a second perspective view (FIG. 12*b*) of a second mixing element with an inlet.
Figure 12B:
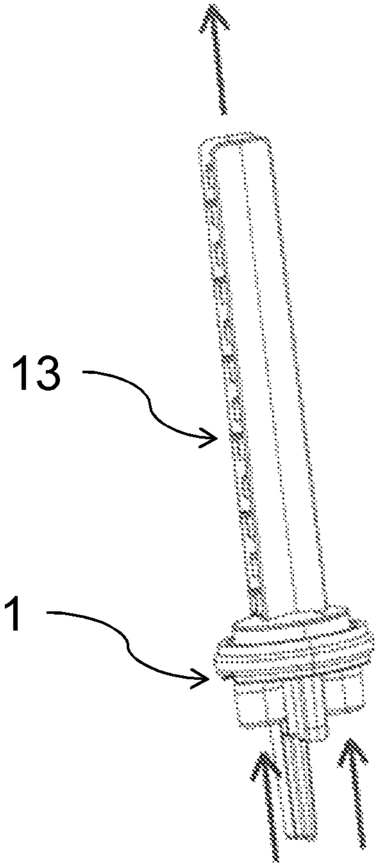

FIGS. 12*a* and 12*b* depict an additional mixing element 13 with an inlet 1. It can be clearly seen in FIG. 12*a* that the disk-shaped or funnel-shaped collar 15 covers the compensation channel 4 in the inlet 1 in the direction of discharge of the components, so that the components flow from the inlet 1 centrally into the mixing element 13 through a central intake opening 13*b* (see FIG. 13*a*).

Figure 13A:
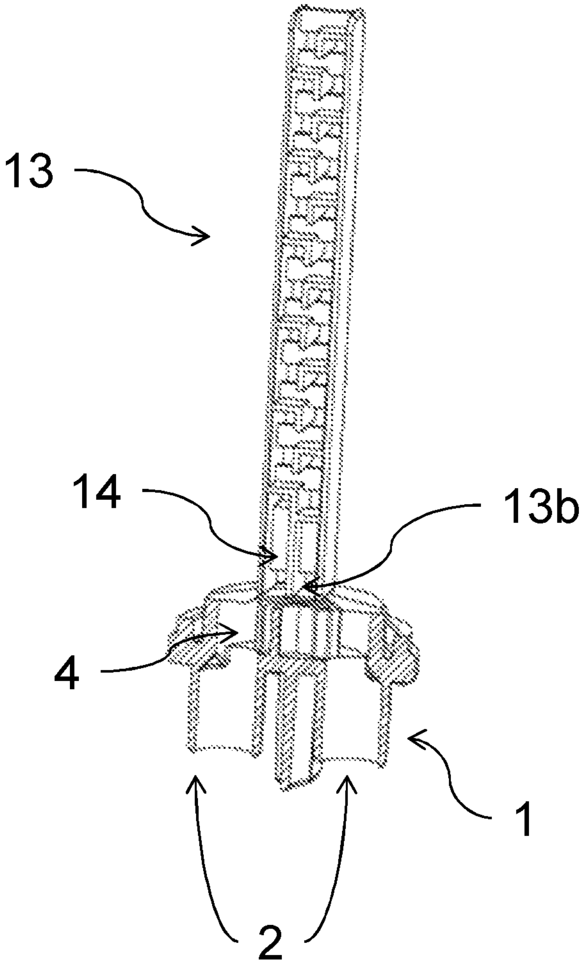
FIGS. 13*a* and 13*b* show a first perspective view (FIG. 13*a*), and a side view (FIG. 13*b*) of the first mixing elements with an inlet in accordance with FIGS. 12 and 12*b,*
Figure 13B:
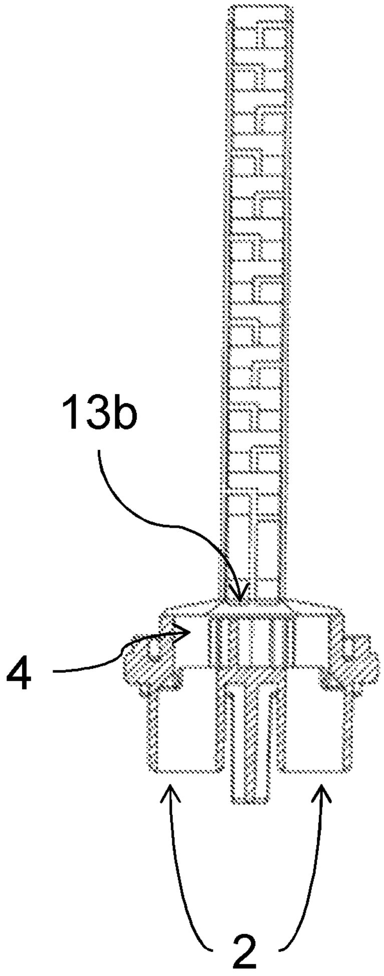

The transition from inlet 1 to the mixing element 13 is also clear from FIGS. 13*a* and 13*b*.

Figure 14:
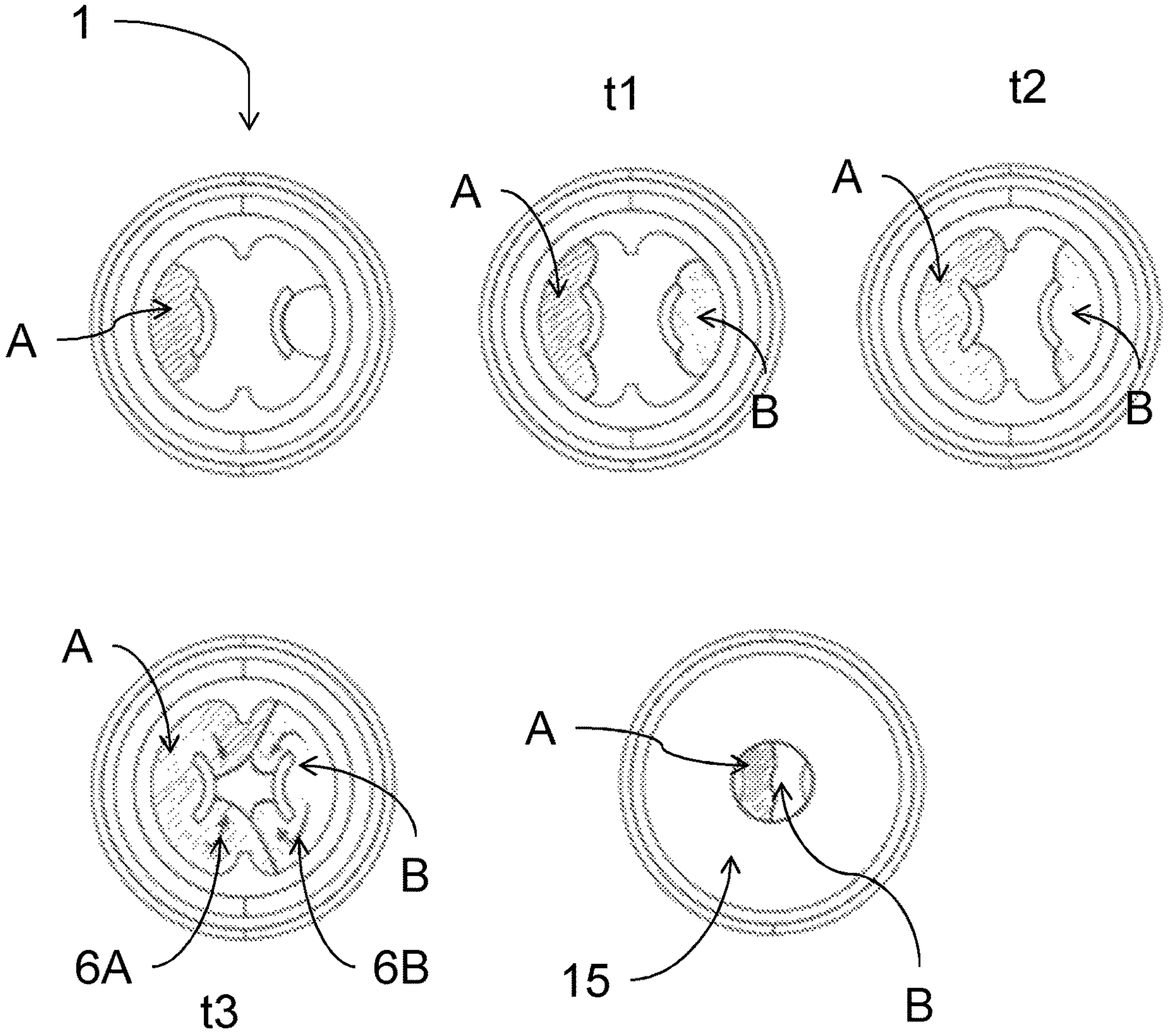
FIG. 14 shows several views from above of the second inlet, of the mixer, and of the components 1 and 2 at different points in time t1, t2 and t3.

FIG. 14 depicts several views from above of the second inlet 1 in accordance with FIGS. 3*a* and 3*b*, of the mixer, and of the components A and B at points in time t1, t2 and t3, which are different and increase in this sequence. The forerun of component A is compensated through the compensation channel 4 in accordance with the disclosure, so that both components A and B enter into the mixing chamber (bottom right) nearly simultaneously.

Figure 15:
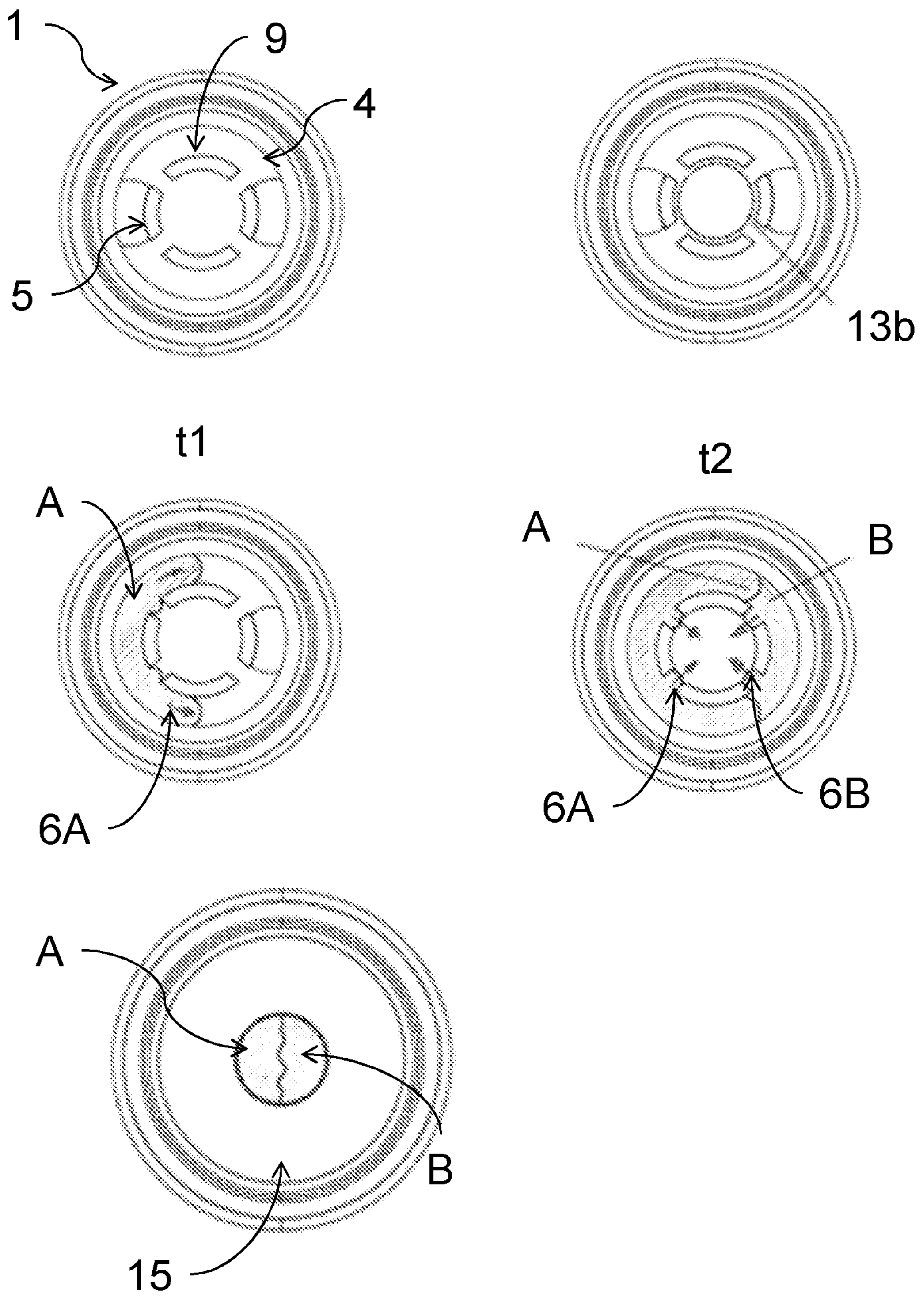
FIG. 15 shows several views from above of the third inlet, both with (top right) and without (top left) the input channel into the mixing chamber (mixer entrance)

A view from above of the third inlet, both with (top right) and without (top left) an input channel 7*a* is depicted in the mixing chamber (mixer entrance) at the top of FIG. 15. In the middle of FIG. 15, the forerun of component A (point in time t1) is depicted at the left, and the position of the components A and B shortly before the flow into the central input channel 7*a* (point in time t2) into the mixing chamber is depicted at the right. As can be seen, the forerun of component A is stopped by the flowing in of component B, so that the present disclosure allows a self-regulation in regard to the volume of the forerun and, furthermore, a compensation to be achieved independently of whether the component A forms the forerun (as depicted) or the component B (not depicted). At the inlet into the mixer (bottom of FIG. 15) (point in time t3), the components A and B are present in the mixing ratio of 1:1 intended here.

Figure 16A:
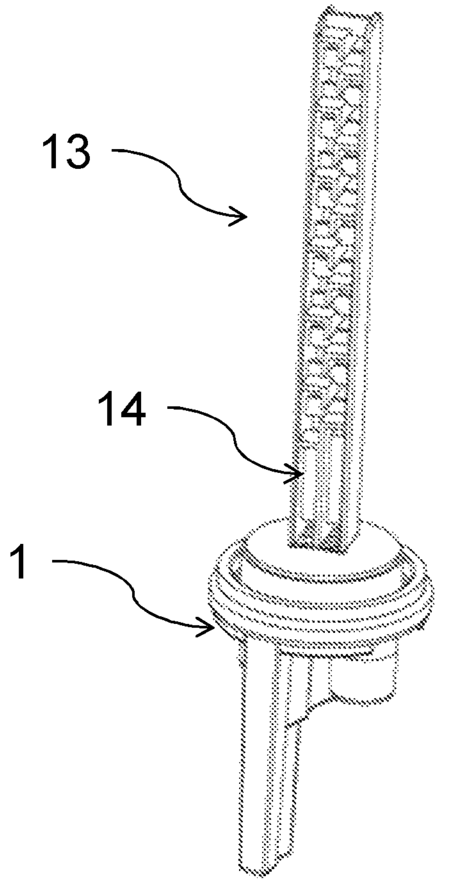
FIGS. 16*a* and 16*b* show a perspective view (FIG. 16*a*) and a detailed view (FIG. 16*b*) of the first mixing elements with an inlet.
Figure 16B:
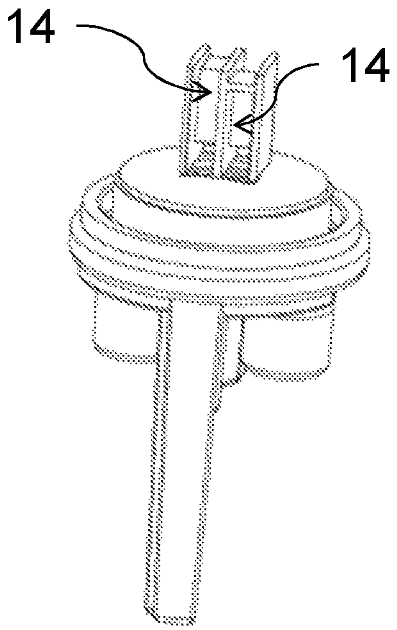

FIGS. 16*a* and 16*b* illustrate the reservoir chambers 14 in the mixing element 13. As can be seen particularly well in the detailed view (FIG. 16*b*), the reservoir chambers 14 are positioned on a line lying in the middle point of the mixing element or diametrically opposite, as the case may be.

The inlets 1 in accordance with a seventh embodiment (FIGS. 17*a* to 17*c*) and an eighth embodiment (FIGS. 18*a* to 18*c*) are optimized for a mixing ratio of the components diverging by 1:1. This is preferably the mixing ratio 1:10.

In this case, a forerun of component present in 10-fold excess is regularly to be expected, since this has a correspondingly higher volume in comparison with the component present in insufficient quantity, so that proportional variations, such as upon the filling process, for example, and thereby a compensating forerun, are relevant practically exclusively for the component that is present in excess.

Figure 17A:
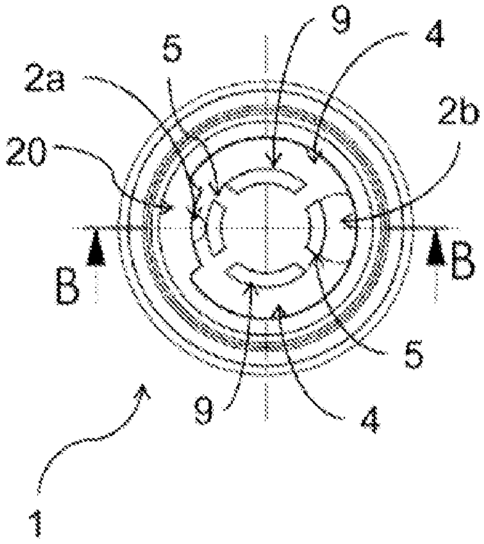
FIGS. 17*a*, 17*b* and 17*c* show a view from above (FIG. 17*a*), a perspective view (FIG. 17*b*), and a longitudinal section (FIG. 17*c*) along the section plane B-B of a seventh inlet.
Figure 17B:
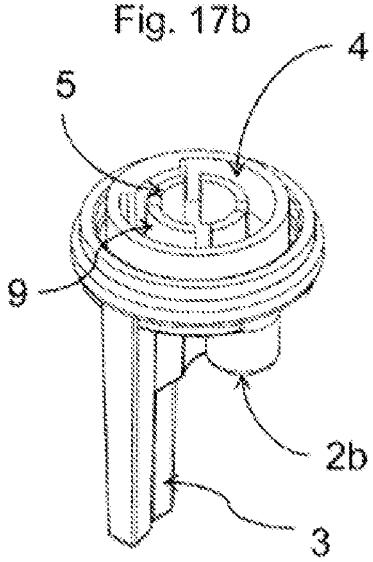
Figure 17C:
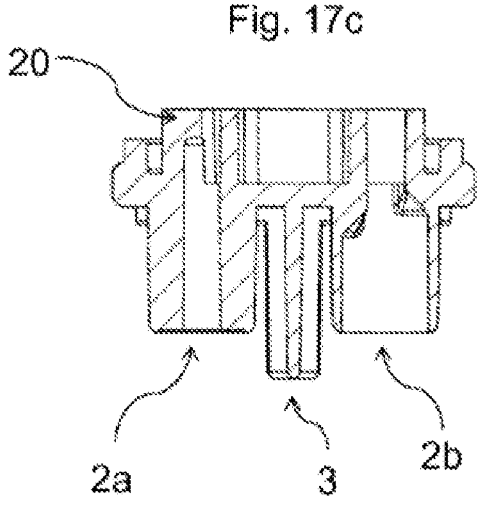

FIGS. 17*a* to 17*c* depict a seventh inlet 1, whereby the component present in insufficient quantity can flow through the input opening 2*a* into the inlet 1, while the component present in excess can flow through the input opening 2*b* and into the inlet 1.

The configuration of the compensation channels 4, of the flow walls 5, and the deflecting walls 9 of the seventh insert 1 is comparable to the third inlet 1 depicted in FIGS. 4*a* to 4*e*, so that reference is hereby made to the corresponding implementations above.

Furthermore, the seventh inlet 1 comprises a baffle plate 20 lying in the direction of discharge of the material, which plate covers the input opening 2*a* in its radial external area at least partially in such a way that the component flowing through the input opening 2*a* is deflected in the direction of the centrally positioned opening to the mixing chamber 7 (not depicted) (FIG. 17*c*). This prevents the component present in insufficient quantity and flowing in through the input opening 2*a* from flowing into an area of the inlet 1, which inlet is no longer flowed through by one of the components during the additional course of the discharge and therefore no longer enters into the mixing chamber. As a result, the baffle plate 20 prevents a loss of the component present in insufficient quantity in the area of the inlet 1. As described above, the advantages connected with the baffle plate 20 can also be achieved by means of the collar 15 of the mixing element 13.

Figure 18A:
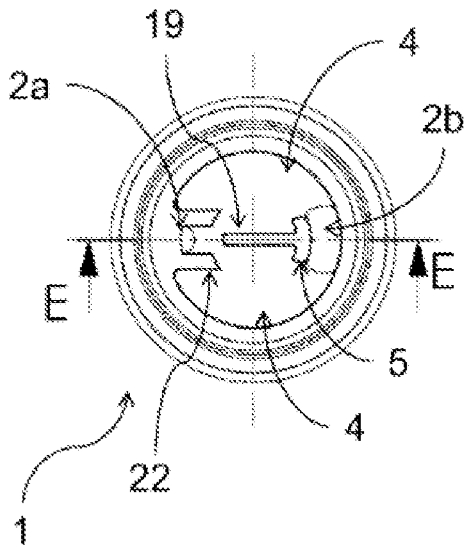
FIGS. 18*a*, 18*b* and 18*c* show a view from above (FIG. 18*a*), a perspective view (FIG. 18*b*), and a longitudinal section (FIG. 18*c*) along the section plane E-E of an eighth inlet.
Figure 18B:
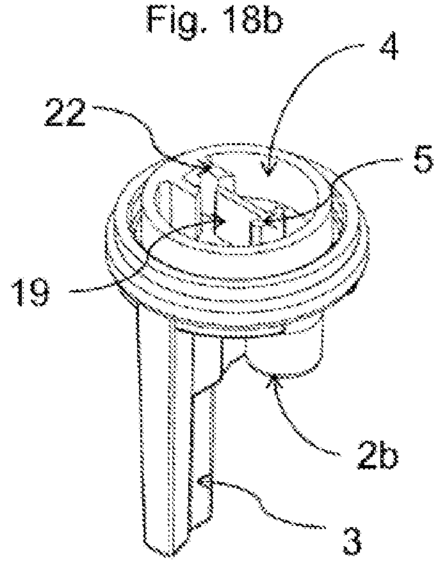
Figure 18C:
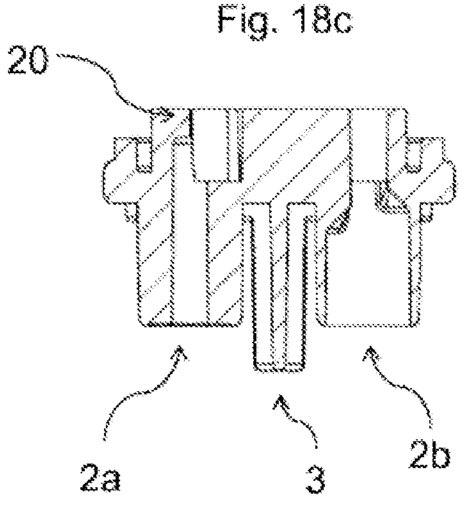

An eighth embodiment of the inlet 1 is depicted in FIGS. 18*a* to 18*c*. The flow wall 5 is continuous here and is centrally connected with a web 19, which is positioned along a connecting axis between the input openings 2*a* and 2*b*. The input opening 2*a* is bordered by a flow directing element 22, so that the input channel 7*a* is oriented in the direction of the central opening to the mixing chamber 7 (not depicted). The compensation channel 4, which can accommodate the forerun there, is provided radially externally. This embodiment has the high internal volume of the compensation channel 4, so that this embodiment is particularly suitable for large-volume forerun.

FIGS. 19*a* to 24*c* depict additional embodiments of a mixing element 13 with a reservoir chamber 14. The components to be mixed can flow in through the intake opening 13*b* provided centrally in the collar 15 from the inlet part 1 (not depicted).

Figure 19A:
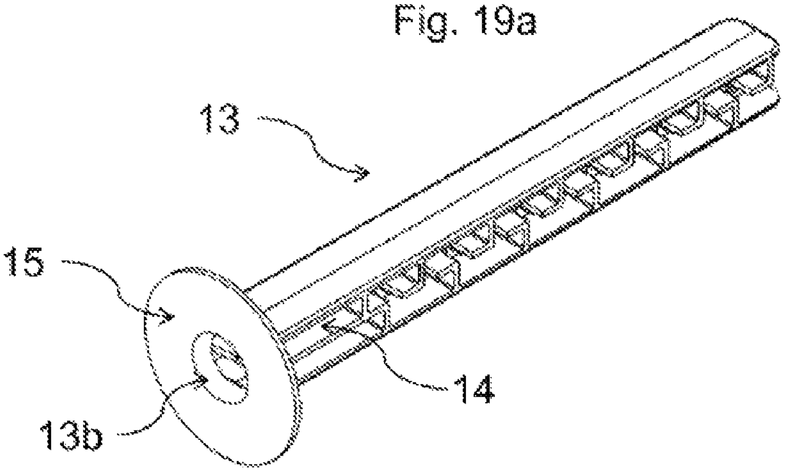
FIGS. 19*a*, 19*b* and 19*c* show a perspective view (FIG. 19*a*), a side view (FIG. 19*b*), and a longitudinal section (FIG. 19*c*) along the section plane A-A of a third mixing element.
Figure 19B:
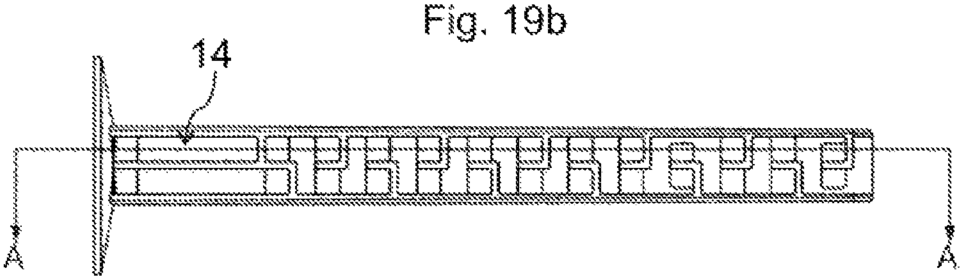
Figure 19C:
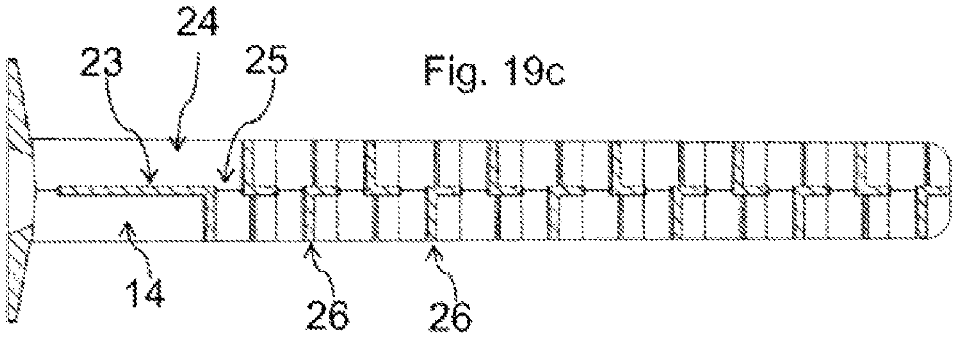

FIGS. 19*a* to 19*c* depict a mixing element 13 in accordance with a third embodiment. The arrangement of the reservoir chamber 14 of the first part of the mixing element 13, considered in the direction of discharge of the material, can be seen from the longitudinal view of FIG. 19*b*. In addition, the section plane A-A is depicted, while the corresponding longitudinal section is depicted in FIG. 19*c*.

When the components flow in through the intake opening 13*b*, these are divided by a central wall 23 and flow partially into a reservoir chamber 14 and partially into a flow chamber 24. The components flow from the flow chamber 24 through a through-opening 25 and into the chambers of the mixing element 13, the length of which is defined in the direction of discharge of the material through the transverse wall 26.

In the third embodiment depicted here, the cross-section of the through-opening 25 is smaller than the cross-section of the flow chamber 24. The smaller cross-section, thus the cross-section of the through-opening 25 here, is thereby decisive for the drop in pressure upon the discharge of the components. Relatively high discharge pressures can hereby appear, whereby the discharge pressure is also influenced by the configuration of the mixing element 13 and the specific viscosity of the components.

Figure 20A:
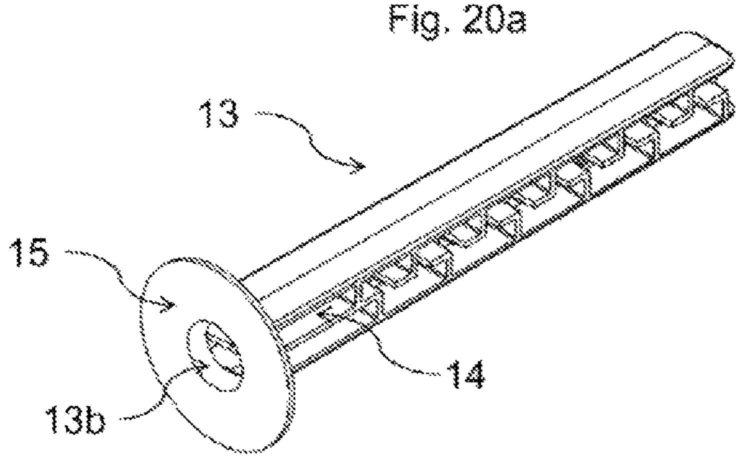
FIGS. 20*a*, 20*b* and 20*c* show a perspective view (FIG. 20*a*), and a side view (FIG. 20*b*), and a longitudinal section (FIG. 20*c*) along the section plane B-B of a fourth mixing element.
Figure 20B:
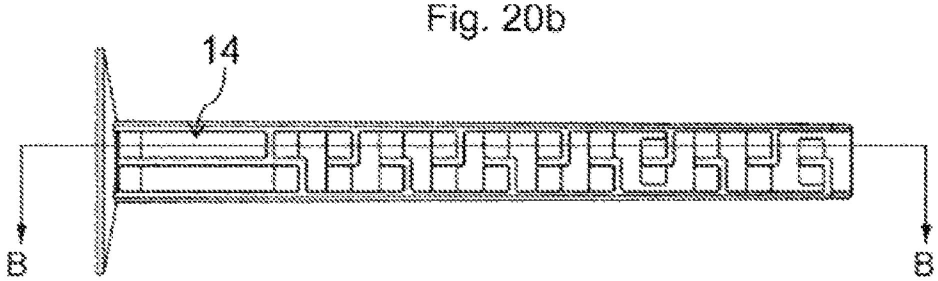
Figure 20C:
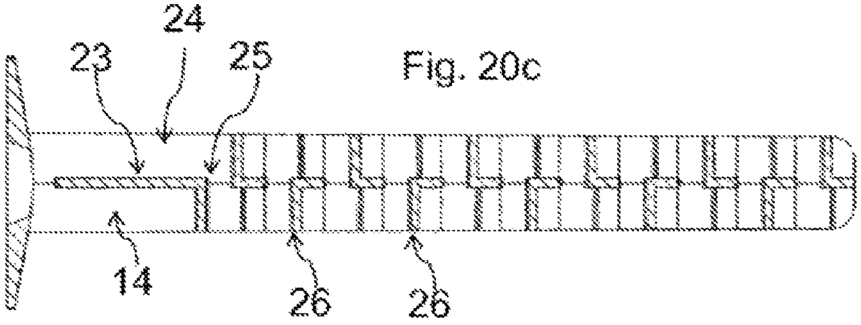

A fourth mixing element 13 is depicted in FIGS. 20*a* to 20*c*, in a perspective view, in a side view, and in a longitudinal section along the section plane B-B. In comparison with the example depicted in FIGS. 20*a* to 20*c*, the mixing element 13 is shortened on its end positioned in the direction of discharge of the material. This reduces the discharge pressure, so that this embodiment is suitable for components with higher viscosity.

Figure 21A:
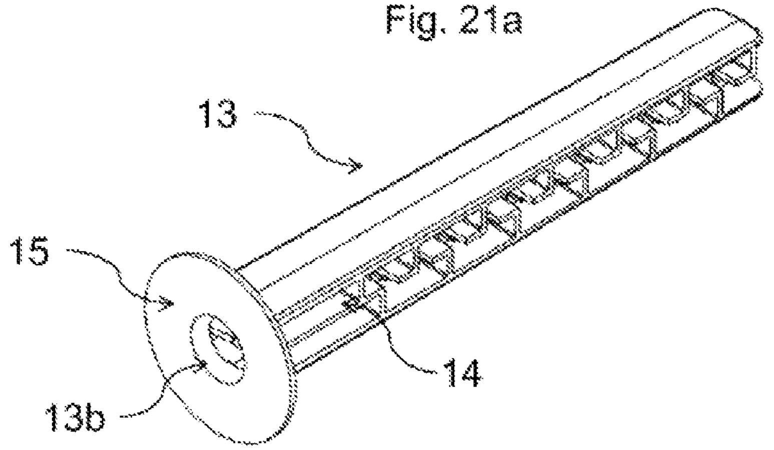
FIGS. 21*a*, 21*b* and 21*c* show a perspective view (FIG. 21*a*), and a side view (FIG. 21*b*), and a longitudinal section (FIG. 21*c*) along the section plane C-C of a fifth mixing element.
Figure 21B:
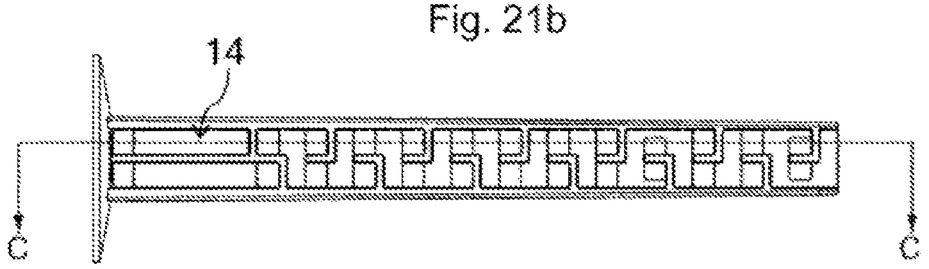
Figure 21C:
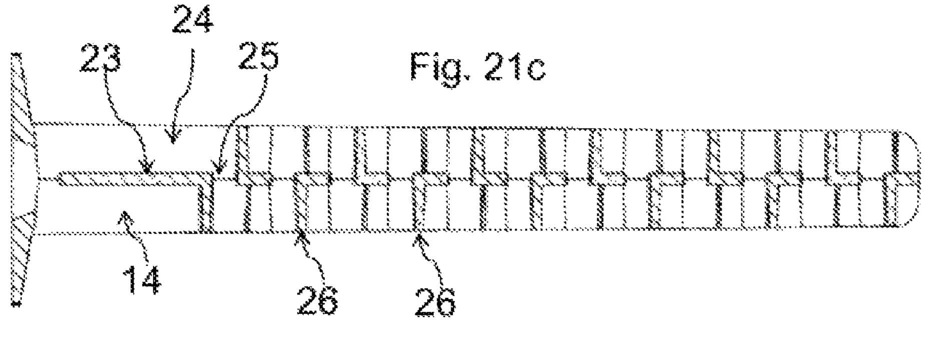

FIGS. 21*a* to 21*c* depict a mixing element 13 in a fifth embodiment. In comparison with the third embodiment in accordance with FIGS. 20*a* to 20*c*, the draft angles on the open sides of the mixing element were increased here. The draft angles have, in particular, an angular range of 0.1° to 2°, preferably 0.1° to 1°, and, most particularly preferably to 0.5°±0.1°.

Figure 22A:
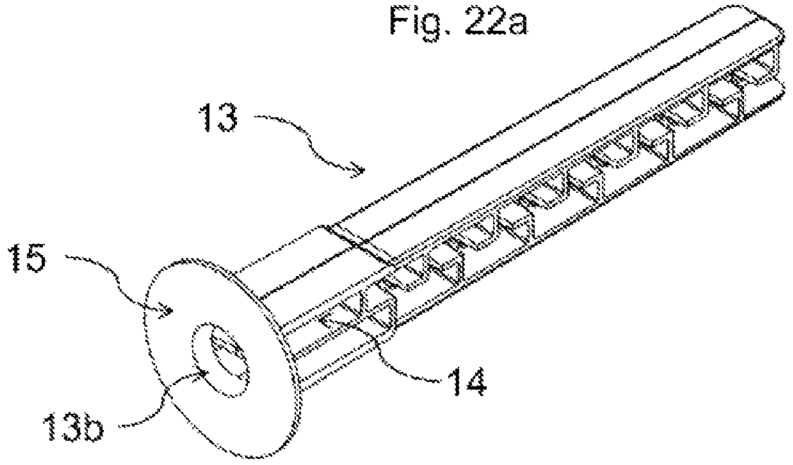
FIGS. 22*a*, 22*b* and 22*c* show a perspective view (FIG. 22*a*), and a side view (FIG. 22*b*), and a longitudinal section (FIG. 22*c*) along the section plane D-D of a sixth mixing element.
Figure 22B:
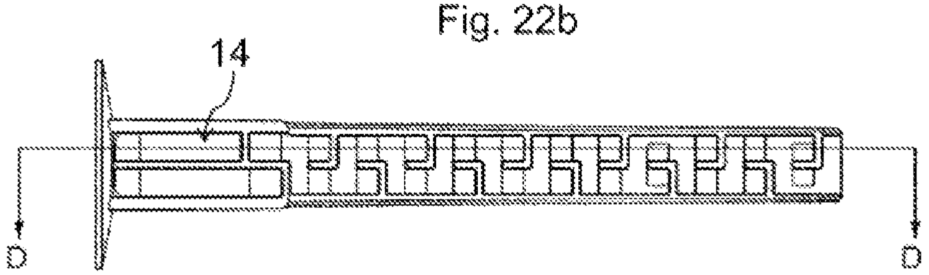
Figure 22C:
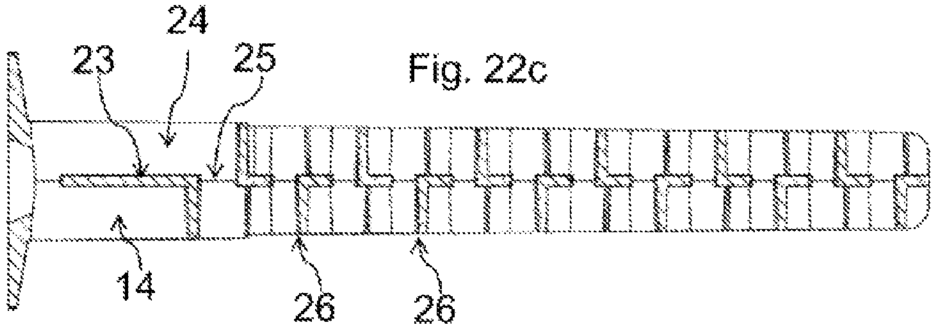

A sixth mixing element, which has been expanded in the area of the reservoir chamber 14 and of the flow chamber 24, is depicted in FIGS. 22*a* to 22*c*. Through that fact, the pressure is reduced upon the discharge of the components, because the cross-section of flow has been increased overall in this area. This embodiment is therefore particularly advantageous for highly viscous components.

Figure 23A:
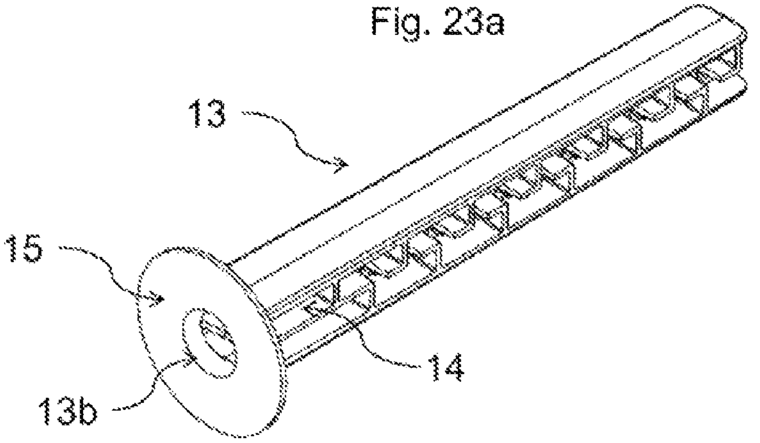
FIGS. 23*a*, 23*b* and 23*c* show a perspective view (FIG. 23*a*), and a side view (FIG. 23*b*), and a longitudinal section (FIG. 23*c*) along the section plane E-E of a seventh mixing element.
Figure 23B:
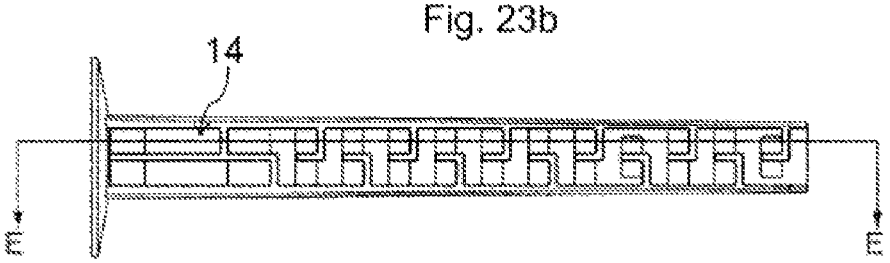
Figure 23C:
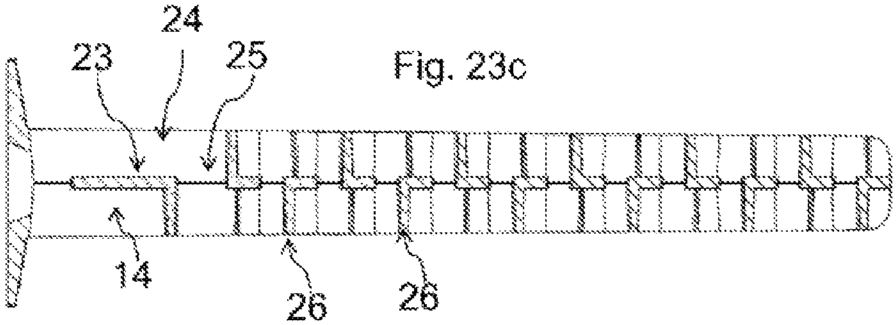

A seventh mixing element 13 is depicted in FIGS. 23*a* to 23*c*. The reservoir chamber 14 has been reduced here, in comparison with the preceding embodiments, in such a way that the through-opening 25 has been increased. The cross-section of flow of the flow chamber 24 and of the through-opening 25 are equally sized here. This leads, in turn, to the fact that the discharge pressure has been reduced in comparison with other embodiments. Since the reservoir chamber 14 has been reduced, however, this embodiment is particularly well suited in combination with an inlet 1, which has a relatively large compensation channel 4 or a reservoir space.

Figure 24A:
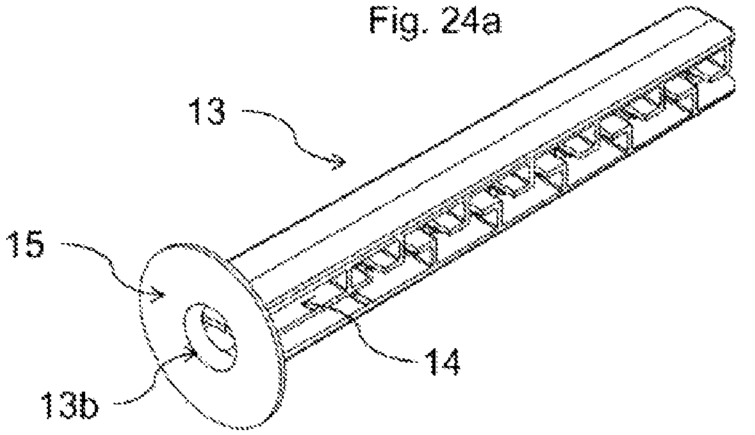
FIGS. 24*a*, 24*b* and 24*c* show a perspective view (FIG. 24*a*), and a side view (FIG. 24*b*), and a longitudinal section (FIG. 24*c*) along the section plane F-F of an eighth element.
Figure 24B:
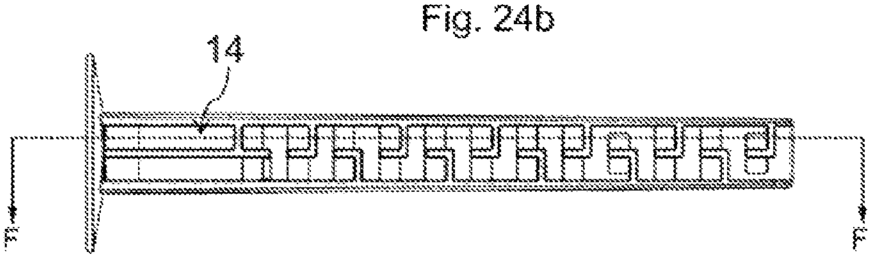
Figure 24C:
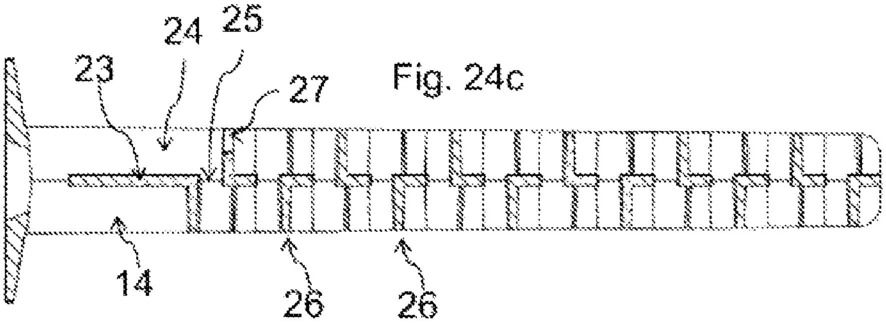

FIGS. 24*a* to 24*c* depict an eighth mixing element. Here, a transverse wall opening 27 in a transverse wall sealing the flow chamber 24 in the direction of discharge of the material was added. This allows a portion of the components passing through the transverse wall opening 27 to flow directly into the adjoining mixing chamber, without the through-opening 25 having to be passed through. Through that fact, the discharge pressure of the components is reduced, since a portion of this does not have to change its direction of flow in order to flow through the through-opening 25.

The invention claimed is:

1. A mixer, comprising:

a mixer housing;

a mixing element positioned at least partially in the mixer housing, wherein the mixing element includes at least one flow chamber;

an inlet connectable with the mixer housing, wherein the inlet includes at least two input openings configured to receive one or more components to be mixed, wherein each of the at least two input openings is flow-connected with the mixer housing by way of at least one input channel;

at least one compensation channel formed in the inlet, wherein the at least one compensation channel connects the at least two input openings with each other such that the one or more components are configured to meet in the compensation channel prior to entering the mixing element, wherein the at least one compensation channel comprises at least two flow walls, formed in a concave or convex manner, provided along a circumference of the at least two input openings, wherein the at least one compensation channel further comprises at least two deflecting walls, and wherein the at least two flow walls and the at least two deflecting walls together form a circular structure; and a reservoir chamber provided in the mixing element, wherein the reservoir chamber is connected to the at least one flow chamber of the mixing element through a single input opening such that forerun entering into the reservoir chamber remains therein.

2. The mixer in accordance with claim 1, wherein the at least one compensation channel comprises two compensation channels formed in the inlet, which respectively connect the input openings with one another.

3. The mixer in accordance with claim 1, wherein the at least one input channel comprise two input channels.

4. The mixer in accordance with claim 3, wherein the at least two input openings are positioned diametrically opposed to one another in the inlet, wherein the two input channels are separated from one another by a partition wall.

5. The mixer in accordance with claim 3, wherein the two input channels are designed such that the one or more components to be mixed with one another are guided into the mixer housing, at least partially, in an enveloping manner.

6. The mixer in accordance with claim 3, wherein the two input channels are connected with one another in a flow-connected manner, so that the one or more components to be mixed are jointly guided into the mixer housing.

7. The mixer in accordance with claim 1, wherein the at least one compensation channel extends in an essentially circular arc between the at least two input openings.

8. The mixer in accordance with claim 1, wherein the at least one compensation channel extends radially outside the at least one input channel.

9. The mixer in accordance with claim 1, wherein the at least one compensation channel and the at least one input channel are formed as depressions or grooves in the inlet, which are, at least certain areas, closed by the mixer housing.

10. The mixer in accordance with claim 1, wherein the inlet and the mixer housing are designed and adapted to one another such that the components to be mixed are deflected from the at least two input openings from a direction of flow extending in parallel with a longitudinal axis of the mixer housing by 90° in a direction of flow transversely to the longitudinal axis of the mixer housing.

11. The mixer in accordance with claim 1, wherein the at least two flow walls are closed in a sealing manner with a disk-shaped or funnel-shaped collar of the mixer housing or of the mixing element.

12. The mixer in accordance with claim 1, wherein a baffle plate and/or a flow directing element is assigned to at least one of the at least two input openings, wherein the baffle plate at least partially covers and/or laterally restricts the respective input opening.

13. The mixer in accordance with claim 1, wherein the least one flow chamber is positioned adjacent to the reservoir chamber, and wherein the at least one flow chamber is connected to the mixer housing by way of a through-opening in a flow-connected manner.

14. The mixer in accordance with claim 13, wherein the at least one flow chamber is restricted in a direction of discharge by a transverse wall and that the transverse wall has a transverse wall opening.

* * * * *